United States Patent
Taylor et al.

(10) Patent No.: US 10,589,656 B2
(45) Date of Patent: Mar. 17, 2020

(54) SYSTEMS AND METHODS FOR DISTRIBUTING MERCHANDISE AND MERCHANDISE KITS AT EMERGENCY LOCATIONS

(71) Applicant: Walmart Apollo, LLC, Bentonville, AR (US)

(72) Inventors: Robert J. Taylor, Rogers, AR (US); Jason D. Bellar, Bentonville, AR (US); Matthew D. Alexander, Rogers, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/367,555

(22) Filed: Mar. 28, 2019

(65) Prior Publication Data
US 2019/0299835 A1 Oct. 3, 2019

Related U.S. Application Data

(60) Provisional application No. 62/650,913, filed on Mar. 30, 2018.

(51) Int. Cl.
*B60P 3/025* (2006.01)
*G05D 1/02* (2020.01)
(Continued)

(52) U.S. Cl.
CPC .......... *B60P 3/0257* (2013.01); *B07C 5/3412* (2013.01); *B07C 5/362* (2013.01);
(Continued)

(58) Field of Classification Search
CPC combination set(s) only.
See application file for complete search history.

(56) References Cited

U.S. PATENT DOCUMENTS

| 3,613,910 A | 10/1971 | Weir |
|---|---|---|
| 4,101,081 A | 7/1978 | Ritter |

(Continued)

FOREIGN PATENT DOCUMENTS

| WO | 2000000300 | 1/2000 |
|---|---|---|
| WO | 2005002747 | 1/2005 |

OTHER PUBLICATIONS

U.S. Appl. No. 62/466,085, filed Mar. 2, 2017, Robert James Taylor.
(Continued)

*Primary Examiner* — Kyle O Logan
(74) *Attorney, Agent, or Firm* — Fitch, Even, Tabin & Flannery LLP

(57) ABSTRACT

There is provided systems and methods involving a portable distribution center for distributing merchandise in response to emergencies. The distribution center includes a transport vehicle with a locomotion system for movement of the transport vehicle to an emergency location. It also includes a conveyor system for sortation and distribution of merchandise items upon arrival at the emergency location. The conveyor system includes merchandise identifier for reading identification data from merchandise item; a plurality of sortation units for moving merchandise items to uniquely identified destination lanes; and a control circuit configured to: assign merchandise items to uniquely identified sortation destination lanes; receive identification data; and communicate with the plurality of sortation units. The distribution center also includes a power supply for energizing the conveyor system and a communication system. At the emergency location, the control circuit separates the merchandise items into predetermined kits that are sorted to the destination lanes.

25 Claims, 20 Drawing Sheets

(51) Int. Cl.
  *B07C 5/34* (2006.01)
  *G06Q 10/08* (2012.01)
  *G06Q 30/06* (2012.01)
  *B07C 5/36* (2006.01)
  *G08B 13/196* (2006.01)

(52) U.S. Cl.
  CPC ......... *G05D 1/0238* (2013.01); *G05D 1/0278* (2013.01); *G06Q 10/0836* (2013.01); *G06Q 30/0639* (2013.01); *G08B 13/19613* (2013.01)

(56) References Cited

U.S. PATENT DOCUMENTS

| | | | |
|---|---|---|---|
| 4,741,656 A | 5/1988 | Bishop | |
| 4,832,204 A | 5/1989 | Handy | |
| 4,988,435 A | 1/1991 | Kimura | |
| 5,188,210 A | 2/1993 | Malow | |
| 5,456,347 A | 10/1995 | Best | |
| 5,471,311 A | 11/1995 | van den Bergh | |
| 5,501,571 A | 3/1996 | Van Durrett | |
| 5,685,416 A | 11/1997 | Bonnet | |
| 5,687,850 A | 11/1997 | Speckhart | |
| 5,725,346 A | 3/1998 | Davina | |
| 5,779,023 A | 7/1998 | Hidai | |
| 5,783,810 A | 7/1998 | Kelly | |
| 5,793,633 A | 8/1998 | Noguchi | |
| 5,921,378 A | 7/1999 | Bonnet | |
| 6,005,211 A | 12/1999 | Huang | |
| 6,230,872 B1 | 5/2001 | Huang | |
| 6,471,044 B1 | 10/2002 | Isaacs | |
| 6,554,123 B2 | 4/2003 | Bonnet | |
| 6,697,702 B1 | 2/2004 | Hahn-Carlson | |
| 7,221,276 B2 | 5/2007 | Olsen | |
| 7,331,471 B1 | 2/2008 | Shakes | |
| 7,426,484 B2 | 9/2008 | Joyce | |
| 7,668,779 B2 | 2/2010 | DeWitt | |
| 7,695,235 B1 | 4/2010 | Rallis | |
| 7,819,260 B2 | 10/2010 | Leimbach | |
| 7,909,155 B2 | 3/2011 | Lupton | |
| 7,938,315 B2 | 5/2011 | Marks | |
| 7,984,809 B1 | 7/2011 | Ramey | |
| 8,033,376 B2 | 10/2011 | Toews | |
| 8,096,402 B2 | 1/2012 | Chastain | |
| 8,284,993 B2 | 10/2012 | Taylor | |
| 8,464,947 B2 | 6/2013 | Swan | |
| 8,489,232 B2 | 7/2013 | Mishra | |
| 8,575,507 B2 | 11/2013 | Pippin | |
| 8,757,363 B2 | 6/2014 | Combs | |
| 8,855,806 B2 | 10/2014 | Hara | |
| 8,924,272 B2 | 12/2014 | Venkatasubramanian | |
| 8,949,148 B2 | 2/2015 | Kumar | |
| 9,004,287 B2 | 4/2015 | Liedl | |
| 9,020,634 B2 | 4/2015 | Bailey | |
| 9,035,210 B1 | 5/2015 | Davis | |
| 9,141,928 B2 | 9/2015 | Pothukuchi | |
| 9,216,857 B1 | 12/2015 | Kalyan | |
| 9,233,633 B2 | 1/2016 | Ketels | |
| 9,275,293 B2 | 3/2016 | Broache | |
| 9,643,789 B2 | 5/2017 | Teichrob | |
| 9,663,303 B2 | 5/2017 | Waldner | |
| 2002/0175112 A1* | 11/2002 | Takizawa | B07C 7/005 209/608 |
| 2004/0071520 A1* | 4/2004 | Krawczyk | B60P 3/055 410/66 |
| 2004/0073333 A1 | 4/2004 | Brill | |
| 2004/0098272 A1 | 5/2004 | Kapsis | |
| 2004/0174244 A1 | 9/2004 | Eidemiller | |
| 2004/0243452 A1 | 12/2004 | Barton | |
| 2006/0020366 A1* | 1/2006 | Bloom | B07C 3/00 700/226 |
| 2006/0273167 A1* | 12/2006 | Baldassari | B07C 3/10 235/385 |
| 2007/0000990 A1 | 1/2007 | Baldassari | |
| 2007/0261941 A1 | 11/2007 | Pelak | |
| 2008/0023302 A1 | 1/2008 | Groom | |
| 2009/0043594 A1 | 2/2009 | Tseng | |
| 2009/0074545 A1* | 3/2009 | Lert, Jr. | B65G 1/0492 414/276 |
| 2009/0272624 A1 | 11/2009 | Edwards | |
| 2010/0005011 A1 | 1/2010 | Dewey | |
| 2010/0322473 A1 | 12/2010 | Taylor | |
| 2011/0106295 A1* | 5/2011 | Miranda | B65G 1/1378 700/216 |
| 2012/0101956 A1 | 4/2012 | Hyre | |
| 2012/0209741 A1 | 8/2012 | Bonner | |
| 2012/0259655 A1 | 10/2012 | Madreperla | |
| 2014/0100769 A1 | 4/2014 | Wurman | |
| 2014/0279272 A1 | 9/2014 | Inman | |
| 2015/0144536 A1 | 5/2015 | Dugat | |
| 2016/0221768 A1 | 8/2016 | Kadaba | |
| 2016/0232479 A1 | 8/2016 | Skaaksrud | |
| 2016/0275441 A1 | 9/2016 | Barber | |
| 2017/0330135 A1* | 11/2017 | Taylor | G06K 7/10297 |
| 2018/0362309 A1 | 12/2018 | Putcha | |

OTHER PUBLICATIONS

U.S. Appl. No. 62/466,095, filed Mar. 2, 2017, Robert James Taylor.
"Conveyors"; Superior Racking and Shelving Ltd.; http://superiorracking.ie/conveyors/; pp. 1-2.
"Dimensioning, Weighing & Scanning—Buyer's Guide"; Mettler-Toledo Cargosan; published in 2014; pp. 1-52.
Aruna, Y. V. et al.: "Automatic convey or System with In—Process Sorting Mechanism using PLC and HMI System"; Int. Journal of Engineering Research and Applications; vol. 5, Issue 11, (Part-3); published Nov. 2015; pp. 37-42.
Belgianpost; "Taxipost: Automated Parcels Sorting—English"; https://www.youtube.com/watch?v=vN9XRIAys38; published Sep. 30, 2009; pp. 1-6.
Bytronic; "Single Conweyor Unit"; Bytronic Educational Technology; pp. 1-2.
Dabade, Sanjay, et al.; "Automatic Sorting Machine Using Conveyor Belt"; International Journal of Innovative and Emerging Research in Engineering; vol. 2, Issue 5; published in 2015; pp. 66-70.
Jones, Douglas; "Automated Receiving, Saving Money at the Dock Door"; Accu☐Sort Systems Inc.; pp. 1-11.
Oladapo, Bankole, et al.; "Model design and simulation of automatic sorting machine using proximity sensor"; Engineering Science and Technology, an International Journal; publsihed May 9, 2016; pp. 1452-1456.
PCT; App. No. PCT/US2019/023591; International Search Report and Written Opinion dated May 28, 2019.
Seibold, Zazilia et al.; "Layout-Optimized Sorting of Goods with Decentralized Controlled Conveying Modules"; Institute for Material Handling and Logistics, Karlsruhe Institute of Technology; pp. 1-6.
Tripathi, Anoop; "Warehouse Conveyor"; https://www.youtube.com/watch?v=QMdmmB_6PrQ; published Oct. 24, 2013; pp. 1-5.
Vaughan, Mark; "Conveyor Sortation Systems"; http://www.plantengineering.com/search/searchsingledisplay/conveyorsortationsystems/df9a8557f0.html; published on Sep. 1, 1999; pp. 1-6.
Viscon; "Viscon Logistics—Sorting Systems"; https://www.youtube.com/watch?v=O00gDoGXN98; published on Sep. 18, 2014; pp. 1-5.

* cited by examiner

*FIG. 10*
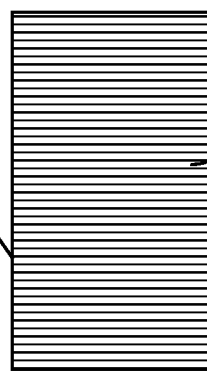
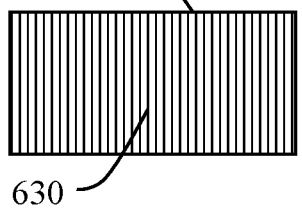
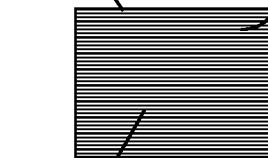
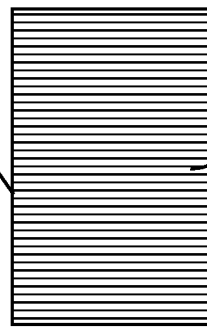

SYSTEMS AND METHODS FOR DISTRIBUTING MERCHANDISE AND MERCHANDISE KITS AT EMERGENCY LOCATIONS

CROSS-REFERENCE TO RELATED APPLICATION

This application claims the benefit of U.S. Provisional Application No. 62/650,913, filed Mar. 30, 2018, which is incorporated by reference in its entirety herein.

TECHNICAL FIELD

This invention relates generally to portable distribution centers, and more particularly, to portable distribution centers used to sort and distribute merchandise.

BACKGROUND

When emergencies arise, it is often important to deliver and distribute merchandise as soon as possible at the emergency location. For example, when hurricanes or other weather phenomena impact communities, time is of the essence in delivering and distributing food and other staple items to the affected individuals. Other less critical emergency circumstances may also arise that require the rapid deployment of portable and easily configurable conveyor systems. As another example, when a long lasting power outage hits a retail store or retail distribution center, it may be desirable to transport a portable conveyor system to the store or distribution center to handle the sortation of merchandise at those locations.

Accordingly, it would be desirable to provide a portable distribution center that can be quickly and easily transported to the location of an emergency. Further, it would be desirable to provide a conveyor system that can be easily configured to sort and divert merchandise to uniquely identified sortation lanes at the emergency location. By being readily configurable, the conveyor system may be set up to handle and sort merchandise kits (specific combinations of merchandise) responsive to the specific conditions and needs of each emergency.

BRIEF DESCRIPTION OF THE DRAWINGS

Disclosed herein are embodiments of systems, apparatuses and methods pertaining to the delivery and distribution of merchandise using a portable distribution center. This description includes drawings, wherein:

FIG. 10 is a schematic diagram in accordance with some embodiments;

Figure 1:
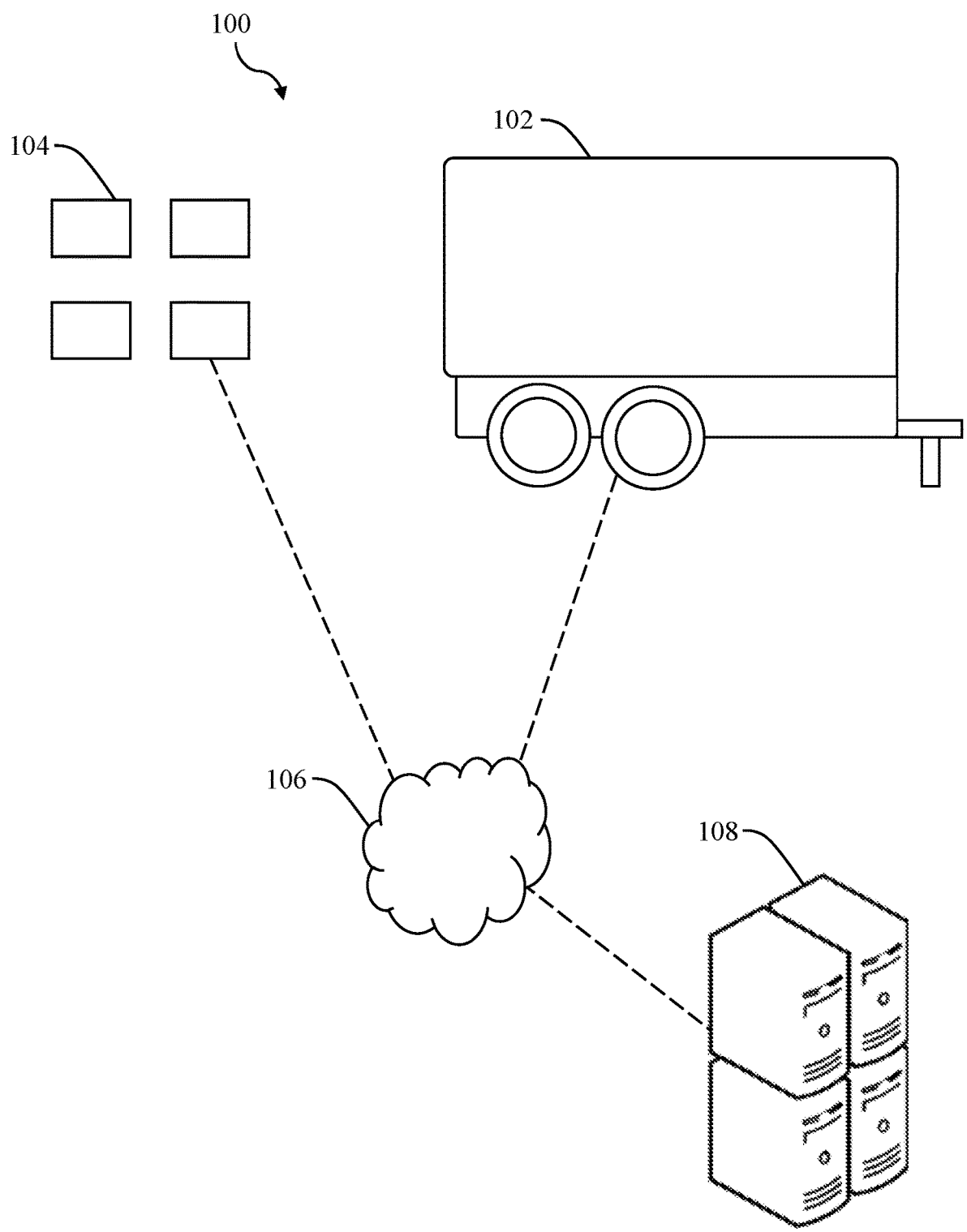
FIG. 1 is a schematic diagram in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for distributing merchandise in response to emergencies. In some embodiments, there is provided a portable distribution center comprising: a transport vehicle including: a locomotion system configured to facilitate movement of the transport vehicle to merchandise distribution location; a floor and a plurality of sidewalls, the plurality of sidewalls configured to be upright during movement of the transport vehicle and configured to be folded down at the merchandise distribution location; and the floor and plurality of foldable sidewalls configured to serve as a work platform during operation of the portable distribution center at the merchandise distribution location. The portable distribution center further comprises: a conveyor system integrated into the transport vehicle and configured for sortation and distribution of merchandise items upon arrival at the merchandise distribution location, the conveyor system including: merchandise identifier disposed at one end of the conveyor system and configured to read identification data from an identification label disposed on merchandise item; a plurality of sortation units configured to receive and move merchandise items to one of a predetermined plurality of uniquely identified sortation destination lanes; and a control circuit operatively coupled to the merchandise identifier and to each of the sortation units, the control circuit configured to: assign the merchandise items to the uniquely identified sortation destination lanes based on emergency conditions at the merchandise distribution location; receive the identification data from the merchandise identifier to determine the uniquely identified destination lane for each merchandise item; and communicate with the plurality of sortation units to move and divert the merchandise items to the uniquely identified sortation destination lanes. The portable distribution center further includes: a power supply configured to energize the conveyor system at the merchandise distribution location; and a communication system configured to transmit and receive instructions regarding operation of the conveyor system. In the portable distribution center, the control circuit separates the merchandise items into predetermined kits, each predetermined kit including one or more different types of merchandise items defining the kit being diverted to a uniquely identified sortation destination lane.

In the portable distribution center, in some implementations, the conveyor system is mounted to the floor of the transport vehicle. In some implementations, the transport vehicle further comprises a plurality of fasteners configured to facilitate movement of the plurality of sidewalls between an upright state and a folded down state. In some implementations, the merchandise identifier comprises one or more of a laser scanner, an RFID scanner, and a barcode reader. In some implementations, the conveyor system further comprises merchandise database associating merchandise item to a uniquely identified sortation destination lane. In some implementations, the control circuit is configured to communicate with a remote command and control center to determine the correspondence of merchandise items to uniquely identified sortation destination lanes. In some implementations, the power supply comprises one or more of a battery, a generator, propane, a hydrogen fuel cell, and a solar cell. In some implementations, the communication system comprises one or more of satellite uplink, fiber, cell, NFC/Bluetooth, radio, and light beacon communication elements. In some implementations, the portable distribution center further comprises a retractable canopy configured for installation above the conveyor system following arrival at the merchandise distribution location, the retractable canopy facilitating the shielding of the conveyor system from environmental conditions. In some implementations, the transport vehicle is an autonomous ground vehicle (AGV), the AGV further comprising: at least one obstacle detection sensor configured to detect obstacles in a direction of travel of the AGV; a navigational system configured to guide movement of the AGV and avoid obstacles; and an AGV control circuit operatively coupled to the locomotion system, the at least one obstacle detection sensor, and the navigational system, the AGV control circuit configured to operate and move the AGV. In some implementations, the portable distribution center further comprises at least one optical sensor configured to detect theft of merchandise items and to facilitate security.

In some embodiments, there is provided a portable distribution center for distributing merchandise items in response to emergencies, the portable distribution center comprising: a transport vehicle including a locomotion system configured to facilitate movement of the transport vehicle to merchandise distribution location. The portable distribution center further comprises: a conveyor assembly configured for sortation and distribution of merchandise items upon arrival at the merchandise distribution location, the conveyor assembly including: merchandise identifier disposed at one end of the conveyor assembly and configured to read identification data from an identification label disposed on merchandise item; a plurality of interchangeable sortation units configured for movement to different positions with respect to one another and for assembly to form different arrangements of the conveyor assembly; the plurality of interchangeable sortation units configured to receive and move merchandise items to one of a predetermined plurality of uniquely identified sortation destination lanes following assembly of the conveyor assembly; and a control circuit operatively coupled to the merchandise identifier and to each of the interchangeable sortation units, the control circuit configured to: communicate with each interchangeable sortation unit to determine its position and the positions of the uniquely identified sortation destination lanes following assembly; assign the merchandise items to the uniquely identified sortation destination lanes based on emergency conditions at the merchandise distribution location; receive the identification data from the merchandise identifier to determine the uniquely identified destination lane for each merchandise item; and communicate with the plurality of sortation units to move and divert the merchandise items to the uniquely identified sortation destination lanes. The portable distribution center also comprises: a power supply configured to energize the conveyor assembly at the merchandise distribution location; and a communication system configured to transmit and receive instructions regarding operation of the conveyor assembly. In the portable distribution center, the control circuit separates the merchandise items into predetermined kits, each predetermined kit including one or more different types of merchandise items defining the kit being diverted to a uniquely identified sortation destination lane.

In the portable distribution center, in some implementations, the transport vehicle further comprises a guide rod or guide track to facilitate transport of the plurality of sortation units from inside the transport vehicle to outside the transport vehicle following arrival of the transport vehicle at the merchandise distribution location. In some implementations, the portable distribution center may further comprise a plurality of hydraulic actuators to facilitate leveling of the conveyor assembly on an uneven surface or adjusting it to a desired height at the merchandise distribution location. It may also include some of the additional implementations addressed above.

In some embodiments, there is provided a method of distributing merchandise items in response to emergencies, the method comprising: providing a transport vehicle comprising a locomotion system configured to facilitate movement of the transport vehicle to merchandise distribution location; loading merchandise identifier of a conveyor assembly onto the transport vehicle, the merchandise identifier configured to read identification data from an identification label disposed on merchandise item; loading a plurality of sortation units of the conveyor assembly onto the transport vehicle, the plurality of sortation units configured to receive and move merchandise items to one of a predetermined plurality of uniquely identified sortation destination lanes; by the transport vehicle, transporting the merchandise identifier and the plurality of sortation units of the conveyor assembly to the merchandise distribution location; energizing the conveyor assembly at the merchandise distribution location; and by a control circuit: assigning the merchandise items to the uniquely identified sortation destination lanes based on emergency conditions at the merchandise distribution location; receiving the identification data from the merchandise identifier to determine the uniquely identified destination lane for each merchandise item; communicating with the plurality of sortation units to move and divert the merchandise items to the uniquely identified sortation destination lanes; and separating the merchandise items into predetermined kits, each predetermined kit including one or more different types of merchandise items defining the kit being diverted to a uniquely identified sortation destination lane.

Referring to FIG. 1, there is shown a schematic example of a portable distribution center 100. As addressed in more detail below, this disclosure is directed generally to a mobile emergency portable distribution center 100 that includes a conveyor assembly. In one aspect, the portable distribution center 100 provides a portable, self-contained supply conveyor and sorting system for distributing supplies needed after an emergency. For example, it could be deployed as part of a disaster response (such as a hurricane) or in response to a massive system failure at a merchandise distribution center that disables conveyors at the merchandise distribution center.

The portable distribution center 100 includes a transport vehicle 102. In one form, as shown in FIG. 1, the transport vehicle 102 may be in the form of a trailer that can easily be moved to the desired location. In this form, for example, a human operator may drive a tractor-trailer to the merchandise distribution location (such as to the disaster response location). The transport vehicle 102 transports multiple conveyor modules 104 (which form the conveyor assembly) to the merchandise distribution location. In FIG. 1, the modules 104 are shown in an unloaded/unassembled form. The transport vehicle 102 may also transport merchandise to be distribution at the distribution location (or this merchandise may be transported on other vehicles). The transport vehicle 102 and/or one or more of the conveyor modules 104 may communicate over a network 106. The portable distribution center 100 may communicate with a central computer system 108 accessible via the network 106.

Figure 2:
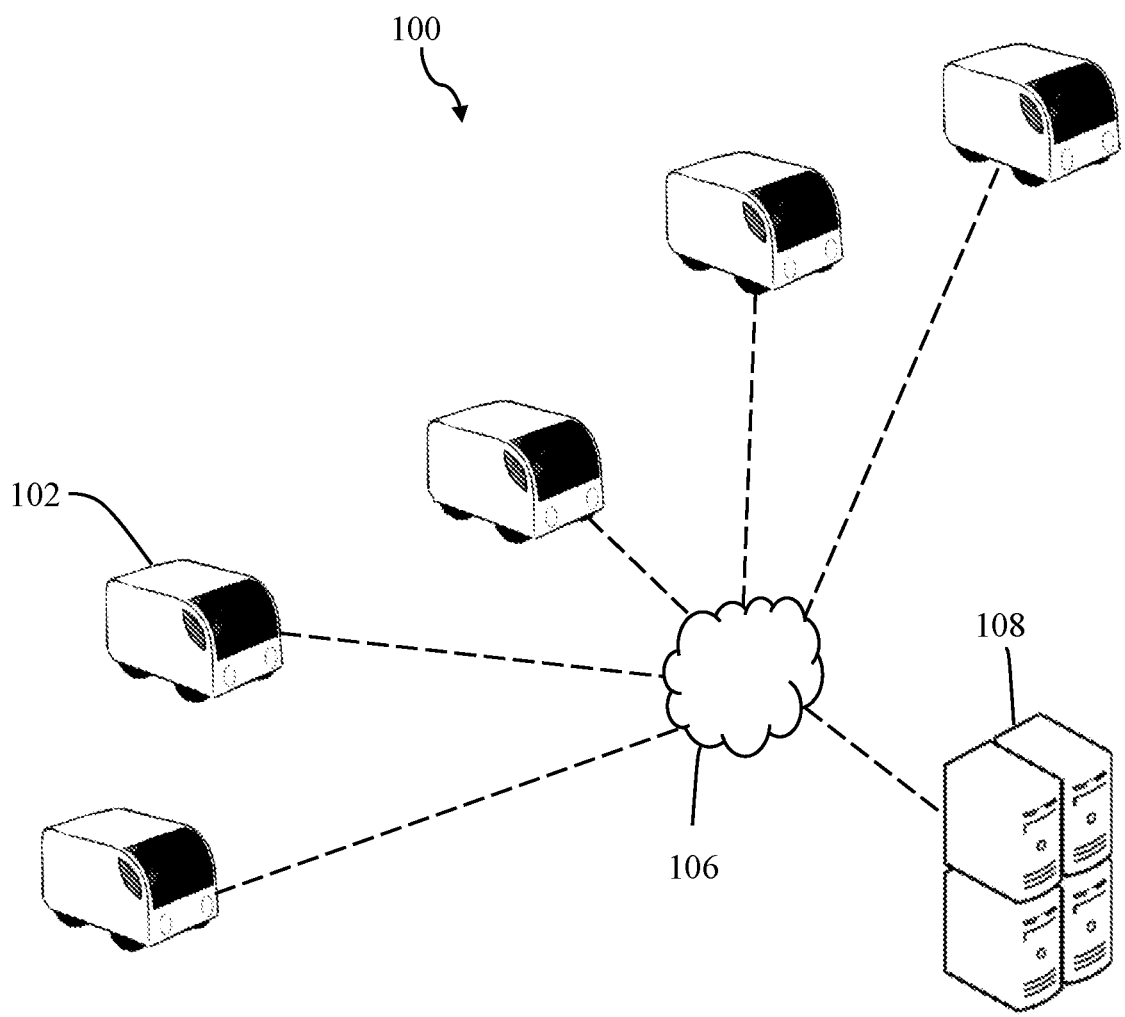
FIG. 2 is a schematic diagram in accordance with some embodiments.

In another form, as shown in FIG. 2, the transport vehicle 102 is in the form of an autonomous ground vehicle (or AGV). So, in this form, instead of involving a human driver, it is generally contemplated that the AGVs are capable of independently travelling to the merchandise distribution location without the need for a human driver. The AGVs may communicate over the network 106 with a central computer system 108. In one form, it is generally contemplated that the AGVs may navigate to the merchandise distribution center with no assistance (or with little assistance) from a remote human operator. It is contemplated that AGVs may be particularly well-suited to respond to certain emergency circumstances without endangering the safety of a human driver (who might otherwise be exposed to dangerous environmental conditions and other circumstances). One or more AGVs may be used to transport the conveyor modules (not show in FIG. 2) while other AGVs may transport merchandise to be distributed.

Figure 3:
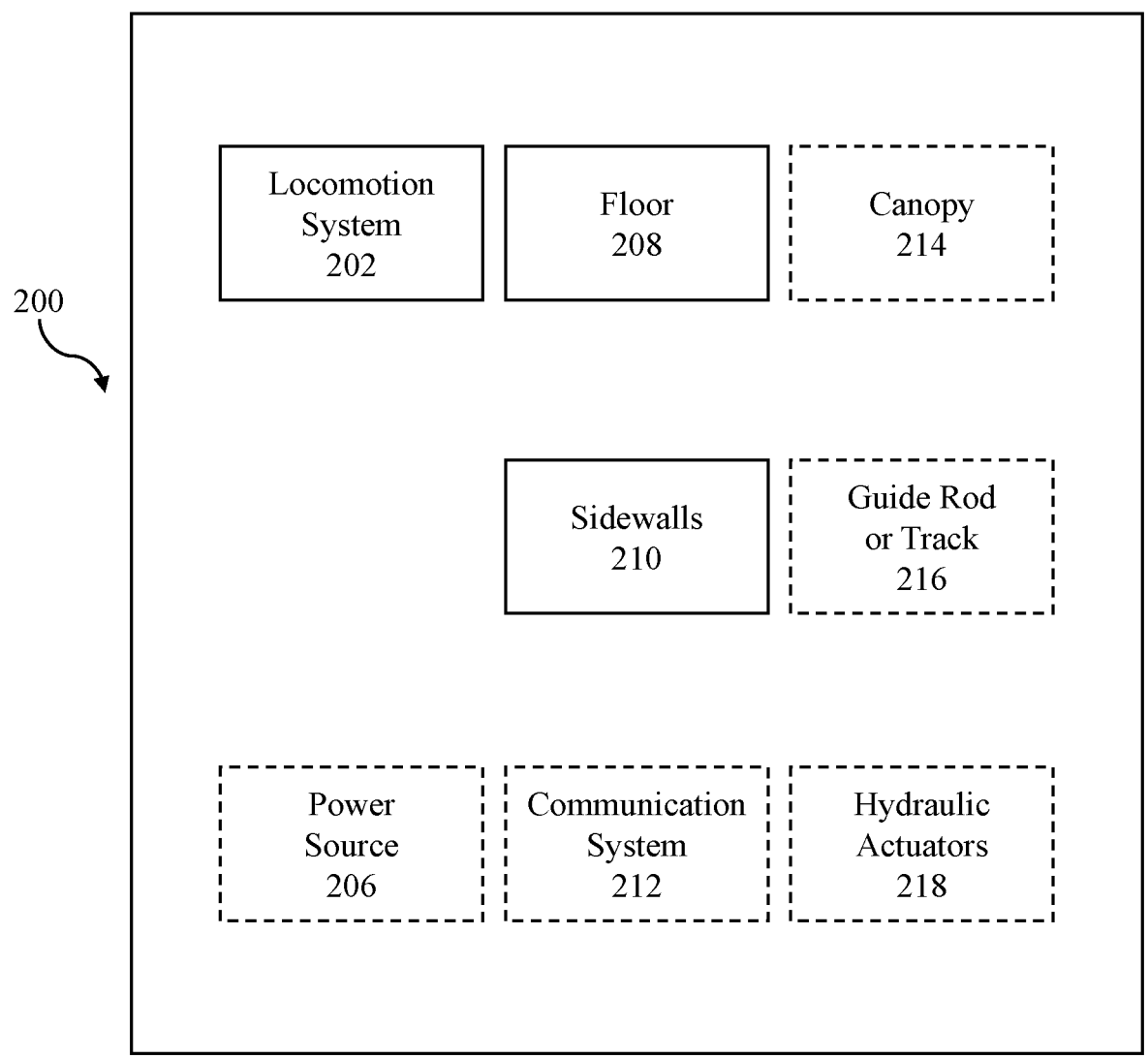
FIG. 3 is a block diagram in accordance with some embodiments.
Figure 4:
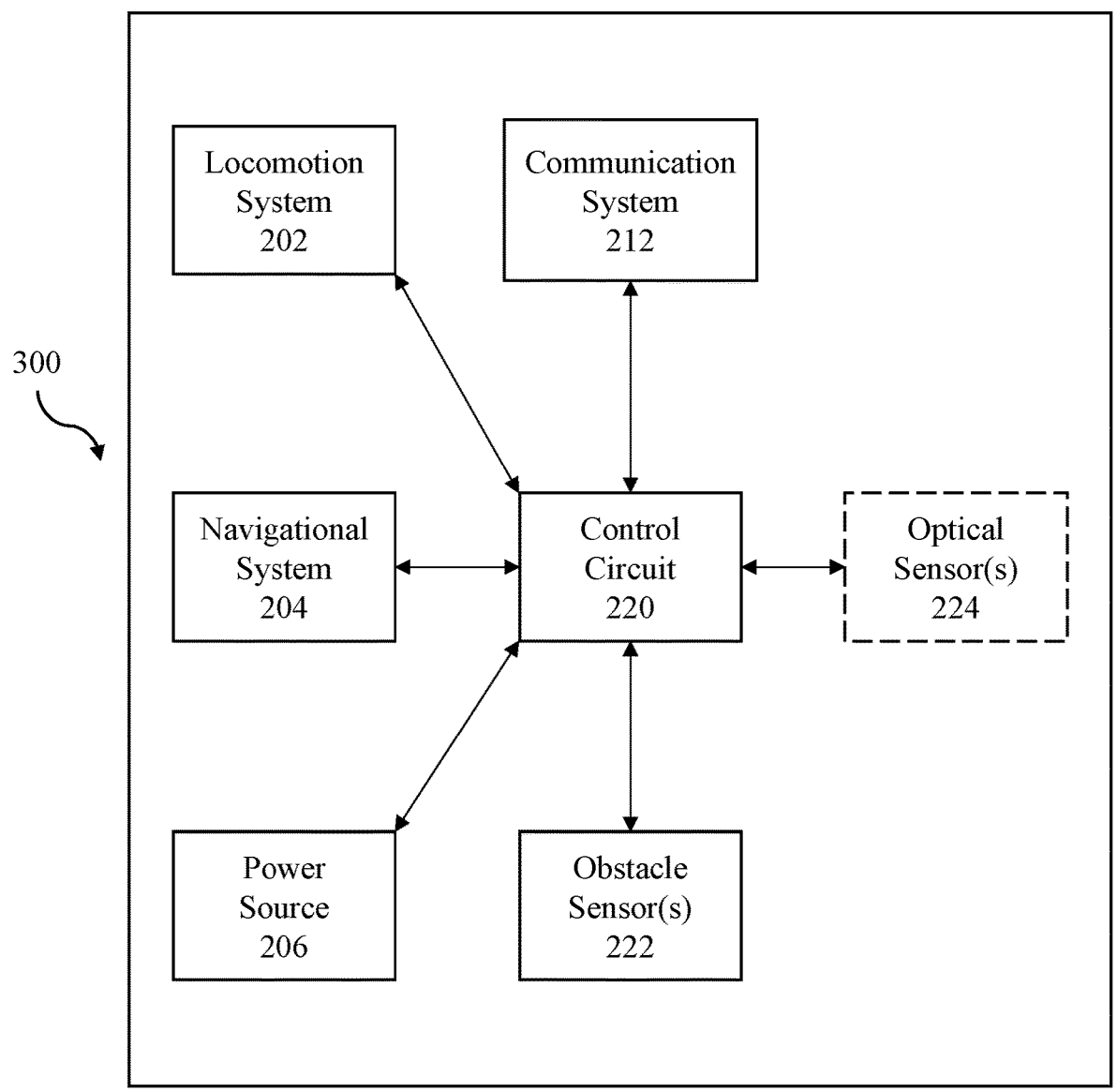
FIG. 4 is a block diagram in accordance with some embodiments.

Referring to FIGS. 3 and 4, there are shown two types of a transport vehicle 200, 300 having many of the same components. The transport vehicle of FIG. 3 may be a trailer 200, and the transport vehicle of FIG. 4 may be an AGV 300. As shown in FIG. 3, the transport vehicle 200, 300 includes a locomotion system 202, a floor 208, and sidewalls 210. The transport vehicle 200, 300 may optionally include (or transport as part of the portable distribution center 100): a power source 206, communication system 212, canopy 214, guide rod or track 216, and hydraulic actuators 218. AGV 300 may include some or all of these components and may additionally include a navigational system 204, an AGV control circuit 220, obstacle sensor(s) 222, and optical sensor(s) 224. As described further below, the transport vehicle 200, 300 may, without limitation, be in the following forms: (1) a transport vehicle 200, 300 with foldable sidewalls that can be folded down upon arrival at the distribution location; and (2) a transport vehicle 200, 300 with removable conveyor modules to allow removal and flexible arrangement of the conveyor assembly at the distribution location.

The transport vehicle 200, 300 includes a locomotion system 202 configured to facilitate movement of the transport vehicle 200, 300 to the merchandise distribution location. It is generally contemplated that the locomotion system 202 may include wheels (or tracks or legs), a motor, and a drive mechanism. For example, in one preferred form, the locomotion system 202 of each transport vehicle 200, 300 includes two sets of wheels. The locomotion system 202 may comprise one or more motors that control one or more of a speed, direction, and/or orientation of one or more wheels (or tracks or legs) on the transport vehicle 200, 300. In the case of an AGV 300 (see FIG. 4), the locomotion system 202 may be configured to be controlled by a control circuit 214 to move the AGV 300 in designated directions.

The transport vehicle 200, 300 may optionally include a navigational system 204 (especially if it is in the form of an AGV 300). The navigational system 204 is configured to guide movement of the transport vehicle 200, 300 and avoid obstacles. The navigational system 204 may include navigational sensor(s) and obstacle detection sensor(s) 222 for detecting obstacles in the direction of travel of the transport vehicle 200, 300. These sensor(s) may be of any of various types, including GPS, compasses and other navigational aids, gyroscopes, magnetometers, accelerometers, radar laser range finders, ultrasound range finders, infrared sensors, and optical/imaging sensors (such as video/camera devices) 224. It is also generally contemplated that the optical/imaging sensors 224 may permit a human operator to remotely guide the AGV 300 in certain circumstances. In addition, in one aspect, it is contemplated that the optical/imaging sensors 224 may act as security cameras to discourage theft and looting in an emergency response zone. In other words, the optical/imaging 224 sensor(s) may be configured to detect theft of merchandise items and to facilitate security.

It is also contemplated that the portable distribution center 100 includes a power source 206 (or power supply). This power source 206 may be incorporated into or transported by the transport vehicle 200, 300 and may also energize the transport vehicle 300 (AGV). It is also contemplated that the power source/supply 206 is configured to energize the conveyor system upon arrival at the merchandise distribution location. Under emergency conditions, it is anticipated that external power may not be readily available, and therefore, the portable distribution center 100 will include its own power source 206. Any of various types of power sources 206 may be used. For example, the power source 206 may include one or more of a battery, a generator, propane, a hydrogen fuel cell, and a solar cell.

The transport vehicle 200, 300 further includes a floor 208 and sidewalls 210. In one form, it is contemplated that the sidewalls 210 are configured to be upright during movement of the transport vehicle 200, 300 and to be folded down upon arrival at the merchandise distribution location. In this form, referring to FIG. 5, the floor 208 and foldable sidewalls 210 are configured to serve as a work platform 228 during operation of the portable distribution center 100 at the merchandise distribution location. Further, in this form, it is contemplated that the conveyor system is integrated into the transport vehicle 200, 300. For example, in this form, the conveyor system 226 may be mounted to the floor 208 of the transport vehicle 200, 300. Further, in this form, any of various types of fasteners may be used to allow folding down of the transport vehicle sidewalls 210 at the merchandise distribution location and to allow return of the sidewall 210 to an upright position upon leaving the merchandise distribution location. In other words, the transport vehicle 200, 300 may include fasteners configured to facilitate movement of the sidewalls 210 between an upright state and a folded down state. These fasteners may include, for example, screws, bolts, nails, hinges, pins, zippers, etc., and any suitable type of fastener may be used.

It is also contemplated that the portable distribution center 100 includes a communication system 212. This communication system 212 may be incorporated into or transported by the transport vehicle 200, 300 and may also receive instructions regarding navigation and operation of the transport vehicle 300 (AGV). Alternatively or in addition, it may be incorporated into the conveyor system 226 and may be configured to transmit and receive instructions regarding operation of the conveyor system 226. Any of various types of communication elements may be used. For example, the communication system 212 may include, without limitation, one or more of satellite uplink, fiber, cell, NFC/Bluetooth, radio, and light beacon communication elements.

It is also contemplated that the communication system 212 may be used at the transport vehicle 200/300 and/or the conveyor system 226 to communicate with a remote central computer system 108 (such as at a remote command and control center).

The portable distribution center 100 may further include a retractable canopy 214. This retractable canopy 214 may be incorporated into or transported by the transport vehicle 200, 300. It is generally intended to shield the conveyor system 226 during operation under emergency conditions. In other words, the retractable canopy 214 may be configured for installation above the conveyor system 226 following arrival at the merchandise distribution location and may facilitate the shielding of the conveyor system 226 from environmental conditions at that location. In one form, the canopy 214 may be a popup canopy with cantilevered arms to shield the conveyor system 226 from environmental conditions and possibly provide overhead lighting.

As indicated above, it is generally contemplated that the trailer 200 and AGV 300 may incorporate the transport vehicle components shown in FIG. 3. The AGV 300 may include certain additional components shown in FIG. 4. It is generally contemplated that the AGV 300 will include a navigational system 204 to autonomously navigate and travel to the merchandise distribution location.

It is further contemplated that the AGV 300 will include an AGV control circuit 220. In this form, the AGV control circuit 220 is operatively coupled to, at least, the locomotion system 202, the obstacle detection sensor(s) 222, and the navigational system 204, and the AGV control circuit 220 is configured to operate and move the AGV 300. The AGV control circuit 220 may comprise a processor, a microprocessor, and the like and may be configured to execute computer readable instructions stored on a computer readable storage memory. The computer readable storage memory may comprise volatile and/or non-volatile memory and have stored upon it a set of computer readable instructions which, when executed by the control circuit 220, cause the control circuit 220 to move and operate the AGV 300 and communicate via the communication system 212. The architectural options for such structures are well known and understood in the art and require no further description here. The control circuit 220 is configured (for example, by using corresponding programming as will be well understood by those skilled in the art) to carry out one or more of the steps, actions, and/or functions described herein.

Figure 5:
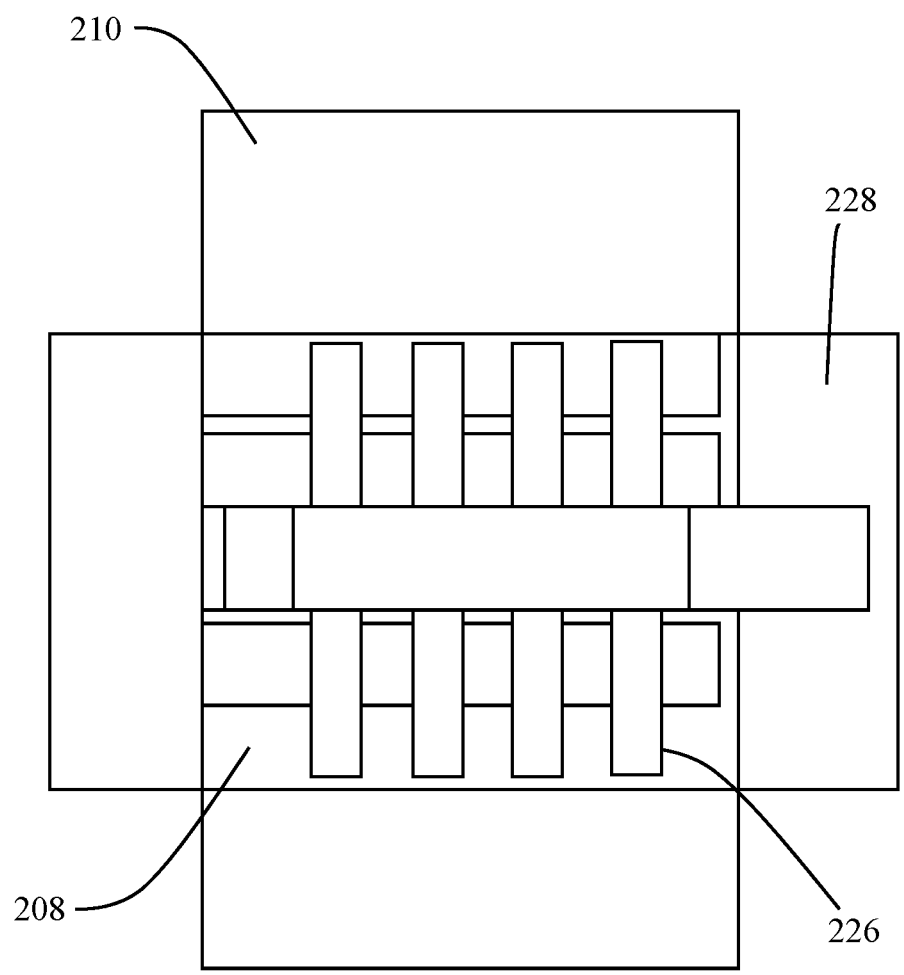
FIG. 5 is a schematic diagram in accordance with some embodiments.

As addressed, one form of a portable distribution center 100 is shown in FIG. 5 in which the transport vehicle 200, 300 includes sidewalls 210 that fold down to serve as a work platform 228 for the conveyor system 226. In this form, it is contemplated that the conveyor system 226 is integrated into the transport vehicle 200, 300. The conveyor system 226 may be mounted to the floor 208 of the transport vehicle 200, 300, and fasteners may be used to convert the sidewalls between their upright and folded down orientations. In this form, the transport vehicle 200, 300 is a specialized transformative transport vehicle.

In another form, the portable distribution center 100 need not include foldable sidewalls 210. Instead, the modules of the conveyor assembly may be removed from the transport vehicle 200, 300. In this form, as addressed further below, it is contemplated that, once removed, the modules of the conveyor assembly may be arranged in various ways to allow flexible set-up of the conveyor assembly (assuming the terrain at the emergency response site is suitable).

Figure 6A:
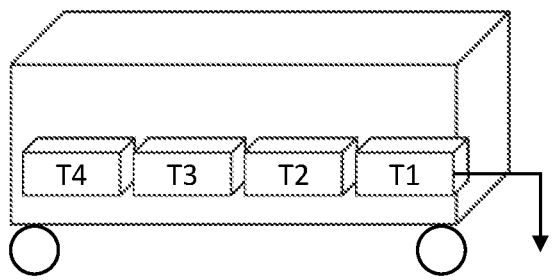
FIGS. 6A, 6B, and 6C are schematic diagrams in accordance with some embodiments.
Figure 6B:
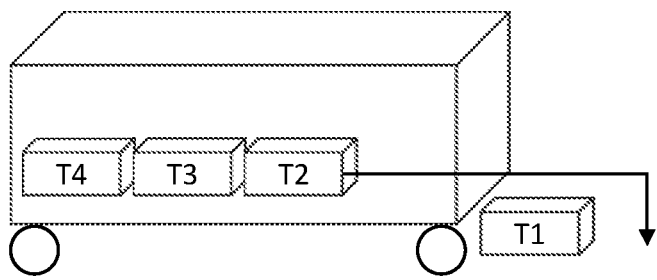
Figure 6C:
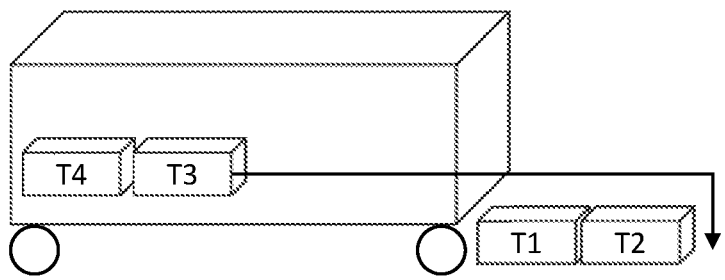

FIGS. 6A, 6B, and 6C show one approach to removing and arranging conveyor modules. In one form, the transport vehicle 200, 300 may include a built-in, self-loading/unloading system for unloading from the transport vehicle 200, 300. In this form, it is contemplated that the transport vehicle 200, 300 may incorporate or transport a guide rod or guide track 216 to assist with removal of the conveyor modules T1, T2, T3, and T4. In other words, the guide rod or guide track 216 may facilitate transport of the modular units T1, T2, T3, and T4 from inside the transport vehicle 200, 300 to outside the transport vehicle 200, 300 following arrival of the transport vehicle 200, 300 at the merchandise distribution location. It is further contemplated that the portable distribution center 100 may include hydraulic actuators 218 to level or adjust the height of the modular units T1, T2, T3, and T4 once they are removed from the transport vehicle 200, 300. In other words, the hydraulic actuators 218 may facilitate leveling of the conveyor assembly on an uneven surface or adjusting it to a desired height at the merchandise distribution location.

For example, in FIG. 6A, the modules T1, T2, T3, and T4 may be propelled toward the target installation area, and each unit may be propelled sequentially either through a pre-set protocol or manually. The guide rod(s) or guide track(s) would keep the modular units T1, T2, T3, and T4 in alignment. In FIG. 6B, after unit T1 is moved outside the transport vehicle 200, 300, it is lowered to the desired operational level. This lowering and adjustment to the desired operational level may be assisted by hydraulic actuators 218, which may be integrated into the unit T1. Then, the unit T2 would be moved over and past the unit T1 and lowered into position. The unit T2 may then be coupled in some manner to unit T1. As shown in FIG. 6C, this approach could be continued with the remaining units T3 and T4 (and any additional units) until all of the units are in place. Alternatively, not all of the units need be unloaded. Some of the units may be left on the transport vehicle 200, 300 based on the available space at the merchandise distribution location or on the number of sortation units needed.

Figure 7:
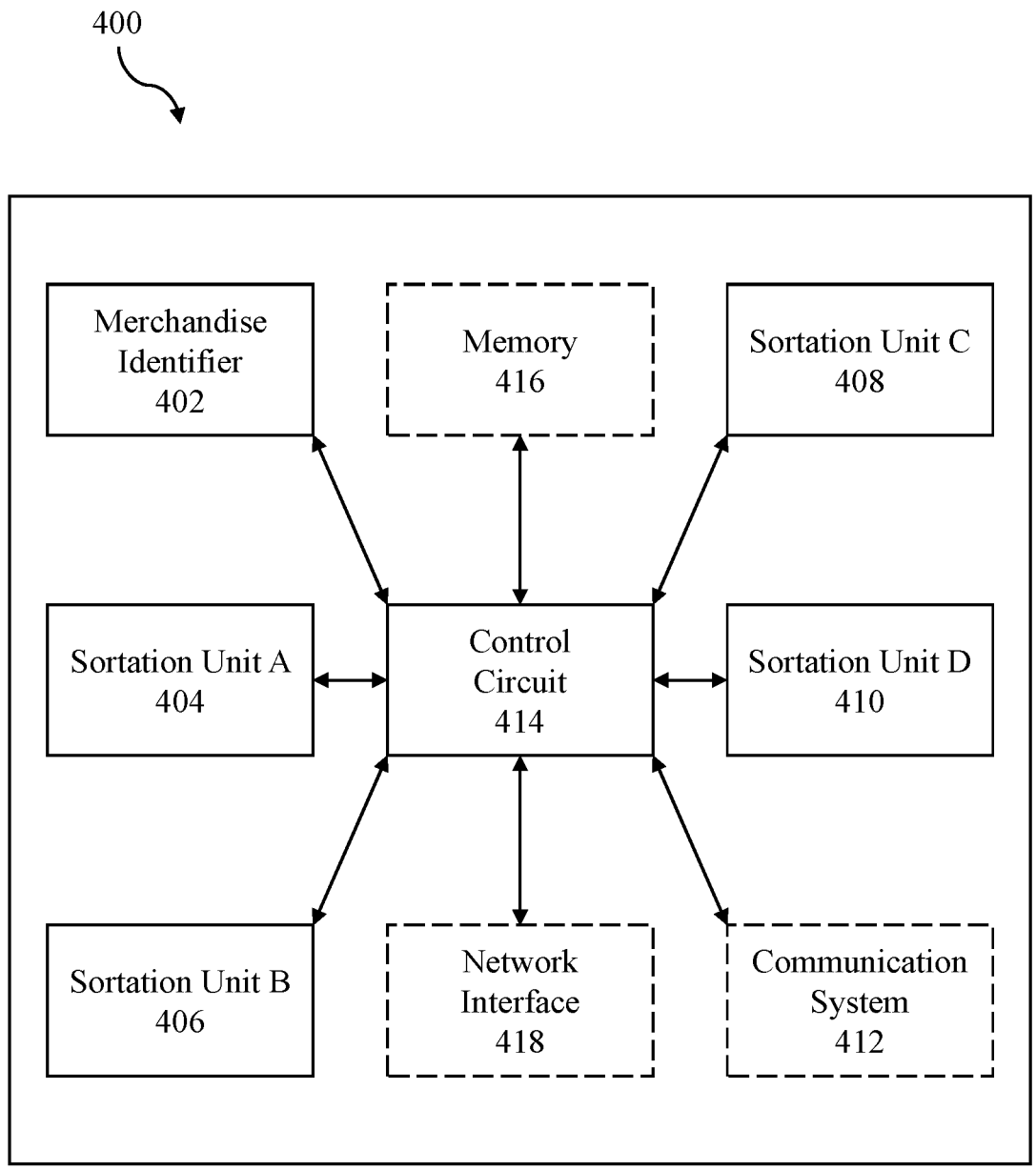
FIG. 7 is a block diagram in accordance with some embodiments.

Referring to FIG. 7, there is shown a conveyor system/assembly 400 forming part of the portable distribution center 100. The conveyor system 400 is configured for sortation and distribution of merchandise items upon arrival at the merchandise location. As described above, in one form, it is contemplated that the conveyor system 400 may be integrated with the transport vehicle 200, 200, and in another form, it is contemplated that modules of the conveyor system 400 may be removable from the transport vehicle 200, 300. So, as addressed further below, in one form, it is contemplated that the modules of the conveyor system 400 may already be pre-arranged for operation, but merchandise items may be assigned to the destination lanes of the different modules. In another form, it is contemplated that the modules of conveyor system 400 are generally interchangeable and may be arranged in a desired order and orientation, but again, merchandise items will be assigned to the different destination lanes.

The conveyor system 400 includes a merchandise identifier 402 that is disposed at one end of the conveyor system 400. The merchandise identifier 402 is configured to read identification data from an identification label disposed on merchandise item being deposition on the conveyor system 400. The merchandise identifier 402 may be its own separate module or it may be mounted onto one of the sortation modules. The merchandise identifier 402 may include any of various types of scanners or readers. For example, the merchandise identifier may include, without limitation, one or more of a laser scanner, an RFID scanner, and a barcode reader.

The conveyor system 400 also includes a number of sortation units that are configured to receive and move merchandise items to one of a predetermined plurality of uniquely identified sortation destination lanes. In the example shown in FIG. 7, there are four sortation units: Sortation Unit A (404), Sortation Unit B (406), Sortation Unit C (408), and Sortation Unit D (410). As should be evident, any number of sortation units may be used, as appropriate to the circumstances. Each sortation unit includes one or more uniquely identified destination lanes (preferably two destination lanes) at which specific types of merchandise are received.

The conveyor system 400 may further include a communication system 412. It is generally contemplated that this communication system 412 may be in addition to one incorporated into the transport vehicle 200, 300 or may be the communication system 212 transported by the transport vehicle 200, 300. In one form, it is contemplated that the communication system 412 may be used to communicate with a remote merchandise database that may identify scanned merchandise and that may be used to associate various merchandise types with specific destination lanes. However, in another form, it is contemplated that the merchandise database may be a local database that forms part of the conveyor system 400. In other words, the conveyor system 400 may include a merchandise database that associates merchandise item(s) to a uniquely identified sortation destination lane.

In addition, the conveyor system 400 includes a control circuit 414 that is operatively coupled to the merchandise identifier 402 and to each of the sortation units 404, 406, 408, and 410. As described herein, the language "control circuit" refers broadly to a system including any microcontroller, computer, or processor-based devices with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 414 may be configured (for example, by using corresponding programming stored in a memory as will be well understood by those skilled in the art) to carry out one or more of the steps, actions, and/or functions described herein.

The control circuit 414 may be coupled to a memory 416, a network interface 418, and network(s) 106. The memory 416 can, for example, store non-transitorily computer instructions that cause the control circuit 414 to operate as described herein, when the instructions are executed, as is well known in the art. Further, the network interface 418 may enable the control circuit 414 to communicate with other elements (both internal and external to the center 100), such as via the communication system 412. This network interface 418 is well understood in the art. The network interface 418 can communicatively couple the control circuit 414 to whatever network or networks 106 may be appropriate for the circumstances. In one form, it is contemplated that the control circuit 414 may access one or more databases (including, for example, a merchandise database) to collect data for performing its functions.

The control circuit 414 controls the operation and sortation of the conveyor system 400. It assigns the merchandise items to the uniquely identified sortation destination lanes based on emergency conditions at the merchandise distribution location. For example, if the emergency conditions are response to an environmental disaster (such as a hurricane), the control circuit 414 may assign such merchandise items as water, soup, bread, ponchos, plates, silverware, etc., to different destination lanes. The control circuit 414 receives identification data from the merchandise identifier 402 to determine a uniquely identified destination lane for each merchandise item. So, as a merchandise item is being deposited on the conveyor system 400, it is scanned or read to determine where it should go (i.e., which destination lane should receive the merchandise item). The control circuit 414 also communicates with the sortation units 404, 406, 408, and 410 to move and divert the merchandise items to the uniquely identified sortation destination lane corresponding to each particular merchandise item (or collection of merchandise items). If the sortation units are interchangeable and have been assembled in some order, the control circuit 414 may, as an initial matter, communicate with each interchangeable sortation unit 404, 406, 408, and 410 to determine its position and the positions of the uniquely identified sortation destination lanes.

In one aspect, this disclosure is directed to the arrangement and sortation of merchandise into merchandise "kits." These kits are generally a specific collection of types of merchandise, which are determined by the specific needs of each emergency. For example, in response to a specific emergency, the emergency wares may include: water, soup, bowls, spoons, diapers, and batteries. In this example, each of the first three destination lanes (lanes 1-3) of six total destination lanes may be assigned a kit with each kit including one soup item, one water item, one set of bowls, and one set of spoons, i.e., a food and water kit. The fourth destination lane (lane 4) may be assigned a kit that only includes water items, i.e., a water kit. The fifth destination lane (lane 5) may be assigned the same merchandise as lanes 1-3 but with the addition of one set of diapers, i.e., an infant kit. The sixth destination lane (lane 6) may be assigned the same merchandise as lanes 1-3 but with the addition of one set of batteries/generator, i.e., a power supply kit.

Accordingly, the control circuit 414 separates the merchandise items into predetermined kits. Each kit includes one or more different types of merchandise items defining each kit being assigned to a uniquely identified sortation destination lane. In one form, it is contemplated that an individual collects and assembles each kit from the merchandise items directed to a particular destination lane. In this form, the different merchandise types making up one kit may be diverted to the same destination lane. In another form, the kit may be assembled prior to being deposited on the conveyor system 400, the kit may be given an identification label to be read by the merchandise identifier 402, and the pre-assembled kits may then be diverted to their assigned destination lanes. As should be evident, a large variety of kits (collections of merchandise) are available.

In one form, the conveyor system 400 may include an invoicing component. In this form, invoicing may be based on the scanning of the merchandise items at the conveyor system 400 (rather than based on what is claimed to be delivered by delivery vehicles). This invoicing may be performed in conjunction with the merchandise identifier 402 as it scans or reads each merchandise item. The control circuit 414 may be configured to generate an invoice corresponding to each merchandise item read by the merchandise identifier 402 or to track totals of each type of merchandise item.

In a hectic emergency environment, where many delivery vehicles may deliver hastily collected merchandise, there is the potential for miscounting or miscalculation of merchandise distributed to individuals at the scene. In this more hectic environment such as a natural disaster or a similar emergency, an invoice may therefore be created at the conveyor system 400 (where the merchandise being distributed can be more accurately tabulated). This invoicing at the conveyor system 400 may eliminate some of the errors caused by possibly inaccurate manifests of merchandise on the delivery vehicles. The invoices could be generated as the products are scanned along the conveyor system 400.

It is contemplated that the portable distribution center 100 may be complemented with additional auxiliary elements that may facilitate the response to the emergency/disaster. Such elements may be included in the transport vehicle 200, 300 (if space is available), or they may be transported by other vehicles to complement the portable distribution center 100 in an emergency/disaster scenario. These elements may include, for example, the following: a remote command area or post that accompanies the center 100; tethered dirigibles, drones, airships, or the like that may provide security, surveillance, weather forecasting, communication, and/or supply delivery; provisions for workers, such as sleeping quarters, restroom facilities, showers, etc.; and 3D printers to print any spare parts that are likely to need replacement to avoid shipping of these spare parts.

In one form, it is generally contemplated that the conveyor components are suitable for use at an emergency response site, and the portable distribution center 100 may include disaster-specific physical elements. For example, in response to flood disasters, the construction of the conveyor components and other apparatuses may be of water resistant materials (aluminum, stainless steel, etc.), composite materials, and/or injection molded structure, with minimized (preferably zero) non-stainless steel or dissolvable fibrous material (paper/fiber), which may serve as a potential breeding ground for harboring bacteria. In contrast to a conveyor system used indoors, the portable emergency version may have sealed non-grease bearings or bronze bearings suitable for marine applications. Sandbags or other barriers may be included to protect against the encroachment of flood water. Preferably, the conveyor system 400 and other components of the portable distribution center 100 would be of rugged construction and weather resistant materials suitable for outdoor deployment.

Figure 8:
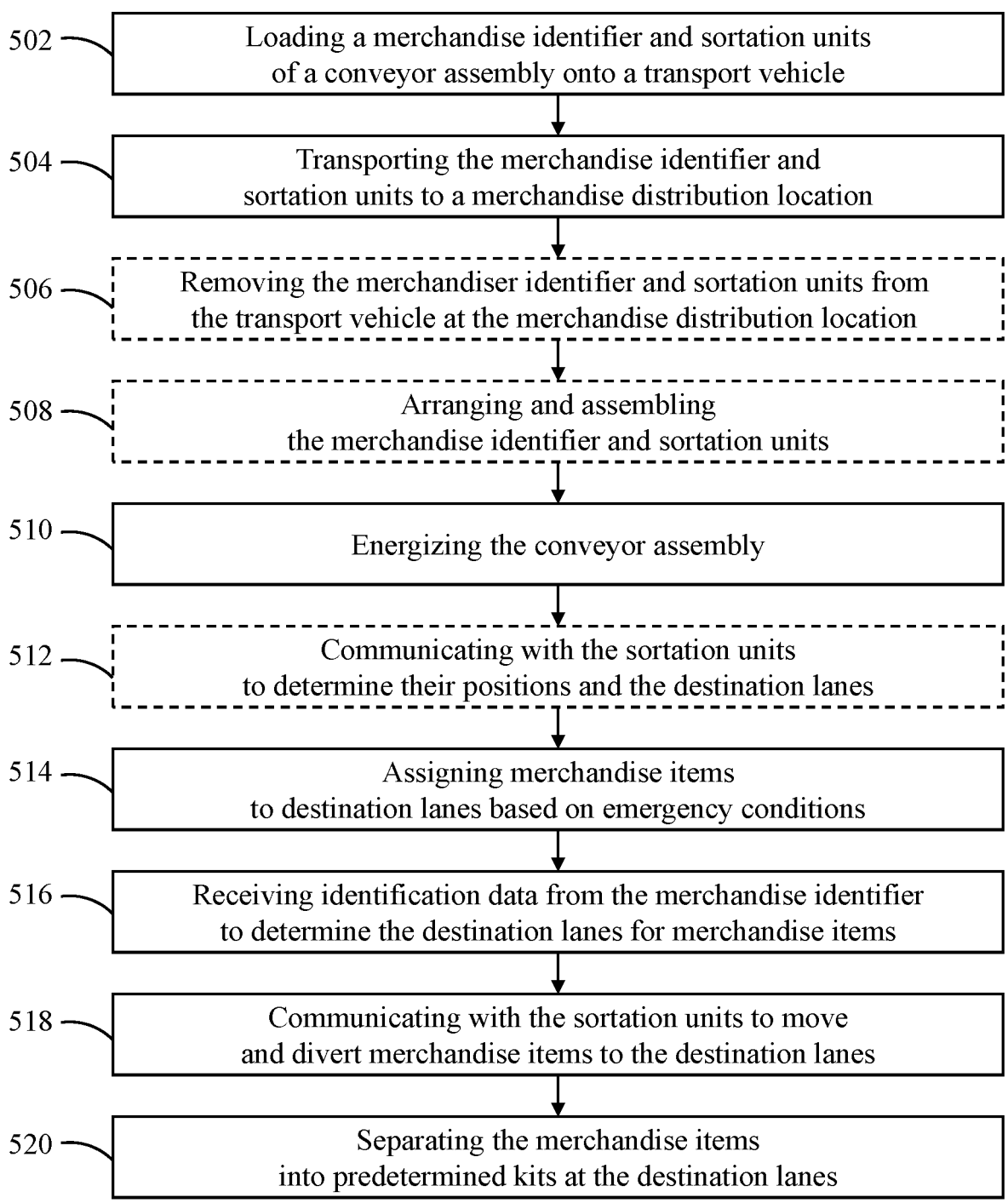
FIG. 8 is a flow diagram in accordance with some embodiments.

Referring to FIG. 8, there is shown a process 500 that uses a portable distribution center for distributing merchandise items in response to emergencies. The process 500 generally involves a transport vehicle, such as transport vehicles 200, 300 described above. It also generally involves a conveyor assembly for sorting the merchandise items, such as the conveyor systems 226, 400 described above.

At block 502, a conveyor assembly is loaded onto a transport vehicle. More specifically, the merchandise identifier and sortation units that define the conveyor assembly are loaded onto the transport vehicle. In one form, it is contemplated that the merchandise identifier and sortation units are then integrated into the transport vehicle, such as by mounting the units to the floor in a permanent or semi-permanent manner. In this form, the conveyor assembly is used in conjunction with the floor and sidewalls during operation. In another form, it is contemplated that the merchandise identifier and sortation units are supported for transport but are otherwise removable upon arrival at the merchandise distribution location (such as an emergency disaster response location).

At block 504, the merchandise identifier and sortation units are transported to the merchandise distribution location. In the integrated form, it is generally contemplated that the sidewalls of the transport vehicle may be folded down to allow the floor and sidewalls to serve as a work platform during operation of the conveyor assembly. In this form, the conveyor assembly is not removed from the transport vehicle. Once the sidewalls are folded down, the conveyor assembly is ready for operation.

Blocks 506 and 508 are optional steps that allow removal and flexible set-up of the merchandise identifier and sortation units for a non-integrated conveyor. At block 506, the merchandise identifier and sortation units are removed from the transport vehicle. If the merchandise identifier is part of or mounted to a sortation unit, its removal is accomplished simply by removal of that sortation unit. This removal may be accomplished, for example, by guide rod(s) or guide track(s) in the transport vehicle, and further, hydraulic actuators may be used to adjust the heights of the modules. Further, at block 508, if the terrain at the merchandise distribution location is suitable, the modules may be arranged and assembled in a desired configuration.

At block 510, the conveyor assembly is energized. It is generally contemplated that the emergency response location may not have ready access to power, so the transport vehicle and/or the conveyor assembly will have a ready source of power that can operate the conveyor assembly. As addressed above, these power sources may include, without limitation, batteries, generators, propane, hydrogen fuel cells, and solar cells. At block 512, after being energized, there may be communication with the sortation units to determine their relative positions and the positions of the destination lanes.

At block 514, merchandise items are assigned to specific destination lanes based on the emergency conditions. It is generally contemplated that the nature of the emergency may dictate the specific types of merchandise to be distributed. For example, if the emergency conditions are in response to an environmental disaster, the merchandise items are likely to include such items as food, water, plates, silverware, outerwear, etc.

At block 516, identification data from merchandise items is read, and this identification data is received from the merchandise identifier to determine the corresponding destination lane. At block 518, the sortation units receive communications to move and divert merchandise items to the assigned destination lanes. At block 520, the merchandise items are separated into predetermined kits (that include one or more types of merchandise). Once distributed, the kits may optionally be moved from the portable distribution center 100 (such as by carts or other vehicles) to secondary locations for transfer to individuals.

Figure 9:
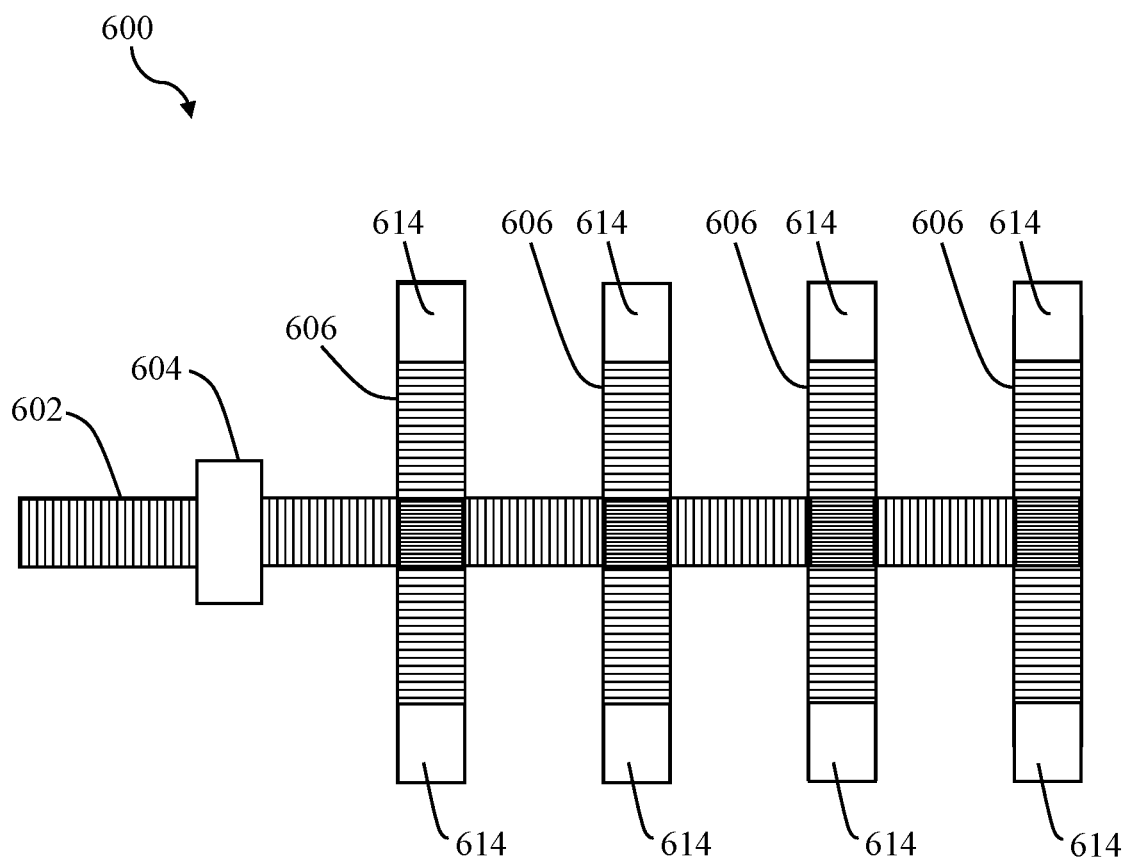
FIG. 9 is a schematic diagram in accordance with some embodiments.
Figure 11:
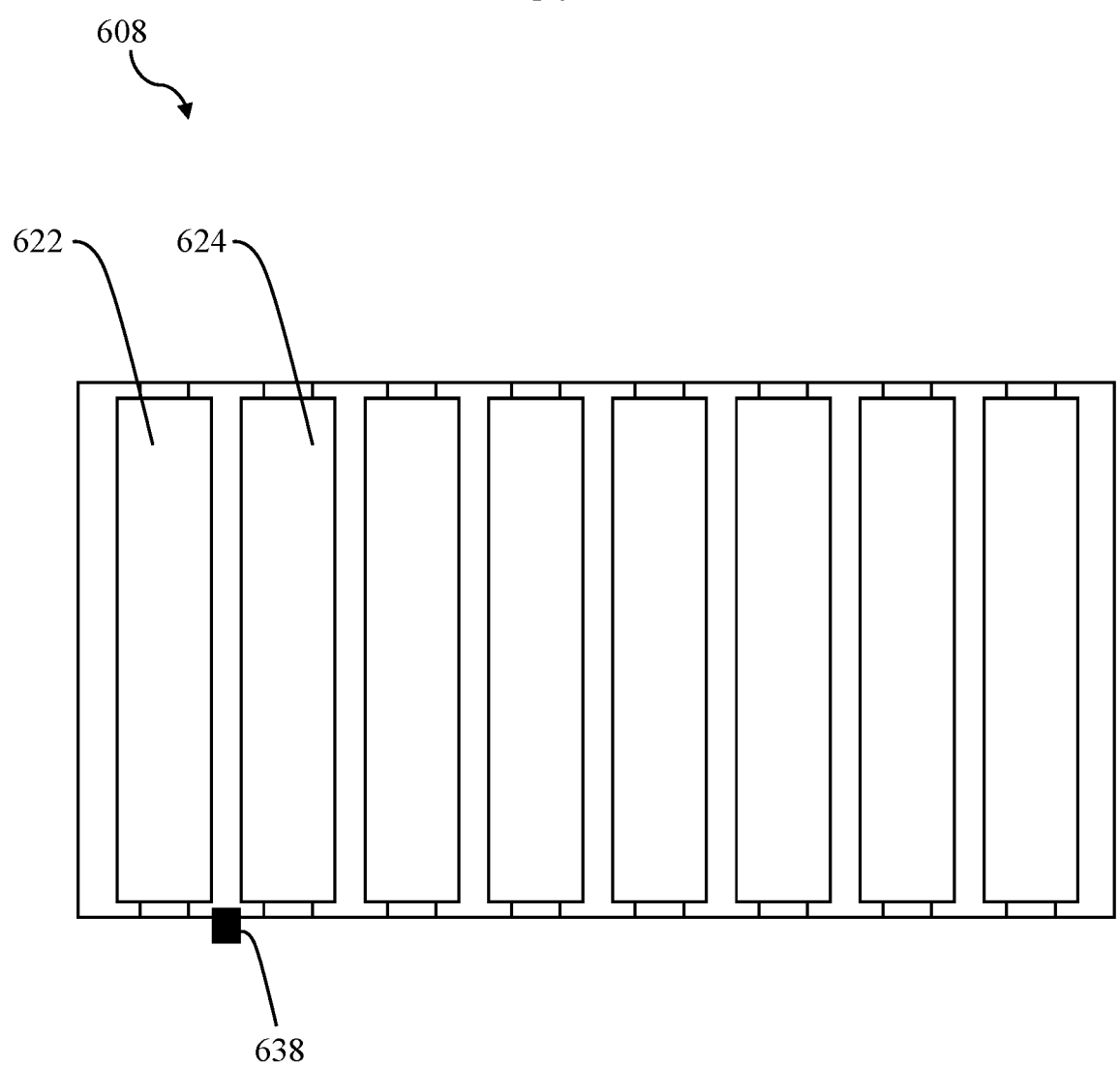
FIG. 11 is a schematic diagram in accordance with some embodiments.

Referring to FIGS. 9-12, there is provided another example of a conveyor assembly 600 that may be used with the portable distribution center 100. It should be understood that all of the conveyor assemblies described herein are similar embodiments, and the description of their operation is equally applicable to other embodiments (including conveyor system 400 described above). The conveyor assembly 600 is composed of various modules, and in one form, it may include an initial conveyor module 602, a product identification module/merchandise identifier 604, and a plurality of sortation modules 606 (FIG. 9 shows four sortation modules 606). Rollers on these modules 602, 604, and 606 may collectively define the conveying surface of the conveyor assembly 600. In this form, merchandise/products in cases (or other containers) may be unloaded from the transport vehicle 200, 300 (or delivery vehicles) at the merchandise distribution location and may be deposited on the initial conveyor module 602, which serves as a staging area for merchandise passing through the merchandise identifier 604.

The initial conveyor module 602 may be coupled to or positioned adjacent to the merchandise identifier 604. In another form, multiple delivery vehicles may be unloaded simultaneously, and the initial conveyor module 602 may serve as a way to funnel the merchandise so that only one merchandise passes through the merchandise identifier 604 at a time. In another form, the conveyor assembly 600 may not include an initial conveyor module 602 at all, and merchandise may instead be unloaded directly at the merchandise identifier 604 (which may be its own separate module or which may be mounted or attached to a sortation module 606).

So, in one form, it is generally contemplated that the merchandise may pass through the merchandise identifier 604 and may have identification labels positioned and oriented on the cases so as to be read by the merchandise identifier 604. When passing by the merchandise identifier 604, the merchandise will be identified and sorted along the conveyor assembly 600 to one of several destination lanes 614, pursuant to any of various adjustable sortation criteria relating to the emergency. As indicated above, in some forms, a discrete merchandise identifier module is not required at all. Instead, in some forms, the merchandise identifier 604 may be mounted at or integrated into one of the sortation modules 606 or may be in a more portable form than a conveyor module.

The merchandise identifier 604 generally reads identification data from an identification label disposed on merchandise passing through or adjacent it. The merchandise identifier 604 may include one or more of any of various sorts of readers 618 suitable for reading various types of labels, including a bar code reader, an RFID reader, an NFC reader, a laser imager, an optical sensor, an image processor, or a text capture device. Generally, the label and merchandise may have to be oriented in a certain configuration, such as facing upwardly and extending horizontally, so as to be readable by the reader 618. In addition, the merchandise identifier 604 may include multiple readers that are configured to read various orientations of the labels. Alternatively, some types of readers may not be limited by the orientation of the label.

Figure 12:
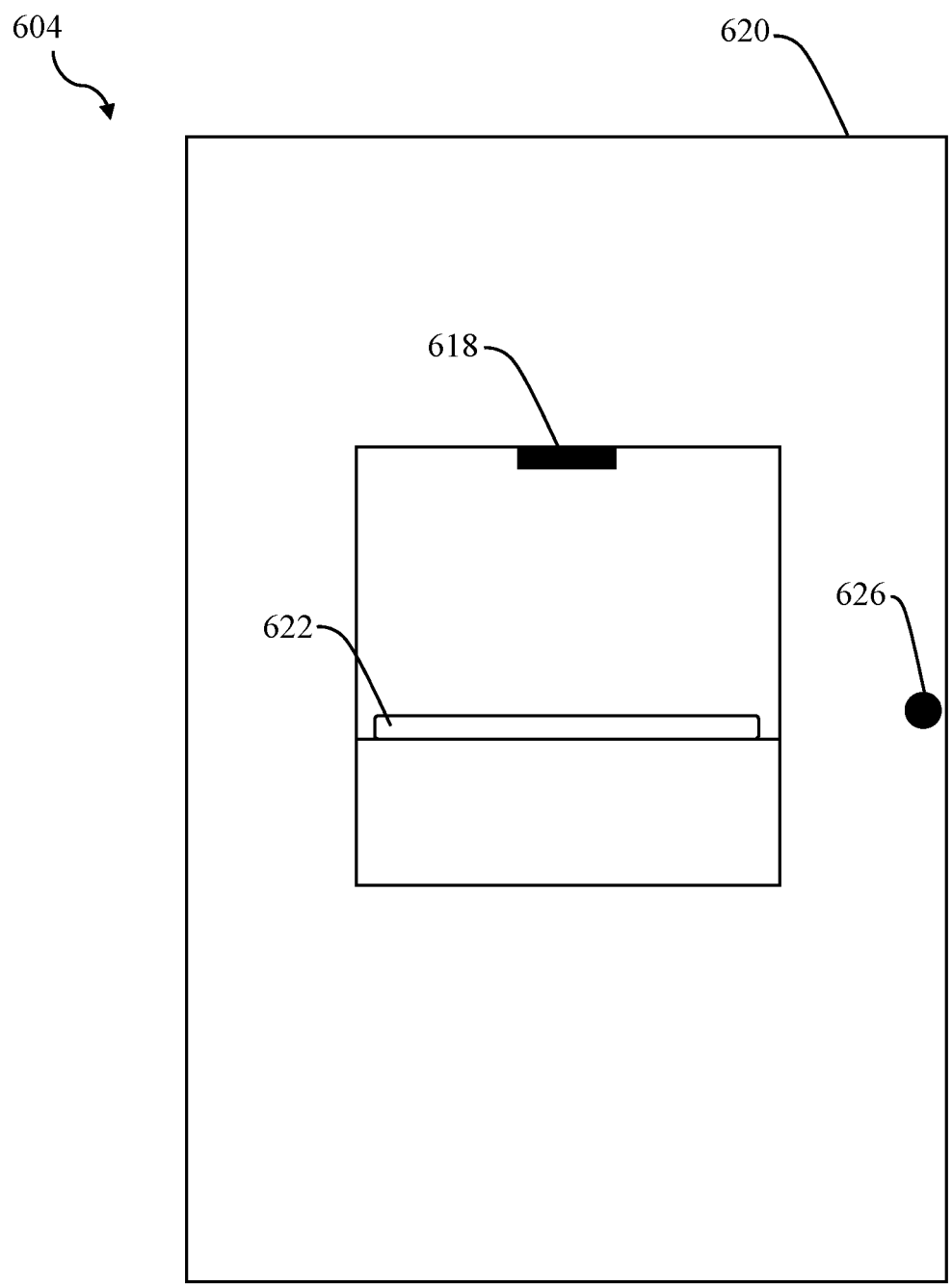
FIG. 12 is a schematic diagram in accordance with some embodiments.

In one form, as shown in FIG. 12, the merchandise identifier 604 may be in the shape of a scan tunnel or arm 620. The merchandise identifier 604 may include a plurality of rollers 622 for moving the merchandise past the merchandise identifier 604. Further, at least one of the rollers 622 may be a powered roller 624 in order to propel the merchandise through the module 604. An operator interface 626 may be coupled to a control circuit that activates the powered roller(s) to move the merchandise past the merchandise identifier 604. As should be evident, the merchandise identifier 604 may be any of various shapes, dimensions, and types.

As products move past the merchandise identifier 604, the merchandise identification label is read and the merchandise is identified. As used herein, the phrase merchandise identification label refers broadly to any sort of merchandise identifier, such as, for example, graphics that are machine readable. Additional data regarding the merchandise may also be included on the label and may be read by the merchandise identifier 604. This identification data (and any additional data) is used in the sortation process to determine a destination lane 614 for the merchandise.

During operation, a merchandise identifier module may be coupled to a sortation module 606 (unless the merchandise identifier 604 is part of a sortation module 606 or is otherwise not a separate module). Each sortation module 606 is then coupled to another sortation module 606 to form a sequential arrangement of modules 606. The modules 606 may be coupled in any appropriate manner. For example, they may simply be arranged side-by-side, or they may be fastened to one another to prevent misalignment of the modules 606. When not integrated into the transport vehicle 200, 300 (and if the terrain where the conveyor is deployed is suitable), the number of sortation modules 606 may be selected so as to fit within the size of space available to the conveyor assembly 600, and thereby, the conveyor assembly 600 is adjustable in size and orientation by the addition or subtraction of one or more modules 606.

In one form, the sortation modules 606 are generally identical and interchangeable. As shown in FIG. 10, each sortation module 606 may include a travel portion 608, a sorting portion 610, and a coupling portion 612. The travel portion 608 may be uni-directional and include a plurality of rollers 630 configured to propel the merchandise in a first (or forward) direction along the rollers. Uni-directional generally refers to the capability to move the merchandise in a forward or backward direction. The shape of the sortation module 606 may be adjusted to accommodate space limitations. For example, the sortation module 606 may be T-shaped with two coupling portions 612 or may be L-shaped with one of the coupling portions 612 folded down or removed.

In one form, the sorting portion 610 is bi-directional and may include a first set of longitudinal rollers 632 configured to propel the merchandise in the first (or forward) direction and a second set of longitudinal rollers 634 to divert the merchandise in a second direction (or sideways) to a sortation destination lane 614. In one form, it is contemplated that a control circuit may cause the second set of rollers to "pop up," or elevate, when merchandise is to be diverted to a destination are. Further, it is generally contemplated that there will be two destination lanes 614 for each sorting portion 610 (one to the left and one to the right), and the second set of rollers 634 are rotatable in a clockwise or counterclockwise manner so as to divert the merchandise to one of these two destination lanes 614. If the merchandise is to proceed in the first (or forward) direction, it is propelled in that direction by the first set of rollers 632, and the second set of rollers 634 do not "pop up."

In FIG. 10, the sortation module 606 is shown with the travel portion 608 arranged before the sorting portion 610. However, it should be understood that this arrangement may be reversed so that the merchandise reaches the sorting portion 610 and may then proceed in any one of three directions, i.e., straight along the travel portion 608 or sideways along one of the coupling portions 612. In some instances this arrangement may have the advantage of provided for three destination lanes 614 (rather than just two).

Further, it should be understood that this type of conveyor assembly 600 is just one example. This disclosure addresses various features of the conveying and sorting process, and these features may not rely on any specific type of conveyor assembly. For example, although rollers are described, in some forms, the conveyor assemblies may use other conveying structures, such as belts, in addition to or in lieu of rollers. As another example, although certain diverting technology is described (sorting portion 610), other ways of diverting merchandise may also be used, such as tilting of conveyor portions.

In summary, the sorting portion 610 can sort merchandise in multiple directions (e.g., left or right). In some implementations, each sorting portion 610 can include a first set of rollers 632 to allow merchandise to travel in a first direction along the conveyor assembly 600, and separate pop-up rollers 634 that are activated to direct the merchandise in one of the multiple directions. Sensors can detect when the merchandise is approaching and/or on the sortation module 606, and the control circuit can activate the sortation module 606 (e.g., signal to raise the pop-up rollers 634) and a direction to route. A sensor can detect when the merchandise is off of the sortation module 606 to deactivate the sorting portion 610 (e.g., a photo-eye to cause the pop-up rollers to lower). When the merchandise does not need to be diverted, the merchandise may pass straight onto a subsequent outbound sortation module 606.

The coupling portion 612 includes a plurality of rollers 636 and connects the sorting portion 610 to a destination lane 614. It is generally contemplated that there may be two coupling portions 612 for each sortation module 506 with each coupling portion 612 ending in a destination lane. Further, each coupling portion 612 is preferably adjustable in length to accommodate different space limitations for the conveyor assembly 600. It is also preferably collapsible to facilitate storage of the sortation module 606 when not in use. For example, the coupling portions 612 may be foldable with respect to the sorting portion 610, and/or the travel portion 608 may be foldable with respect to the sorting portion 610.

Generally, the sortation modules 606 may constitute a unitary structure, in which each module 606 include the travel portion 608, the sorting portion 610, and two coupling portions 612. However, as should be evident, the sortation modules 606 need not be a unitary structure. Instead, the sortation module 606 may include separate and/or separable travel, sorting, and/or coupling units. They may be assembled or fashioned together in some manner or simply disposed adjacent of one another.

In one form, the conveyor assembly 600 may be composed of various arrangements powered rollers and non-powered rollers. Non-powered rollers may be coupled to powered rollers in some way, such as by a belt. In one form, it is contemplated that each sortation module 606 includes at least one powered roller 624 with an adjustable rotation speed to maintain a minimum distance between adjacent merchandise. In other words, the control circuit detects the positions of merchandise on the conveyor assembly 600 and may vary the speed of individual rollers or groups of rollers in order to effectively sort/divert individual merchandise or cases to a specific destination. For example, the travel portion 608 may include a powered roller 624, and adjustment of the rotation speed of this powered roller 624 may cause merchandise traveling on the roller surface to speed up or slow down. The conveyor assembly 600 may maintain a minimum distance between adjacent merchandise through the use of a plurality of sensors 638 disposed at predetermined locations on the plurality of sortation modules 606 to detect positions of the merchandise traveling along the sortation modules 606. In one form, the sensors 638 may be optical sensors (or any of various other sensor types) spaced equidistantly along the conveyor assembly 600 that detect merchandise. In this form, the control circuit may be operatively coupled to powered rollers 624 to adjust their rotational speeds. The control circuit may cooperate with the sensors to determine the position of merchandise relative to an adjacent merchandise and may activate a powered roller 624 to adjust the speed of the merchandise to maintain a certain minimum separation distance between these adjacent merchandise.

Referring to FIGS. 13A-15, there is provided another example of a conveyor assembly 701 (and this description is also generally applicable to the previously described conveyor systems 400, 600). In this form, there is disclosed a system 700 including a conveyor assembly 701 having sortation modules 706 that are readily reconfigurable to adjust to changing or disparate space limitations. So, for example, the conveyor assembly 701 may be reconfigured for use in a limited emergency response area with changing space limitations. In one form, this reconfigurability may be suitable for emergencies where the terrain permits easy rearrangement of the sortation modules 706.

The modular conveyor system 700 enables multiple different sortation modules 706 to be coupled together to form a conveyor assembly 701 intended to be utilized with a merchandise sorting system that autonomously sorts merchandise, such as may be unloaded from delivery trucks. The sortation modules 706 can easily be decoupled to allow for easier storage and to allow the conveyor assembly 701 to be moved out of the way when not in use. When the sortation modules 706 are coupled together, their positions can be automatically determined along the conveyor assembly 701 and/or relative to one or more other sortation modules 706 without manual inputs (e.g., if module A is supposed to be placed before module B, but is instead placed after module B, module A and module B will reconfigure sortation destinations to match the physically/geometrically correct sort destinations). The sortation modules 706 need not be arranged in a specific order or arrangement of modules.

Figure 13A:
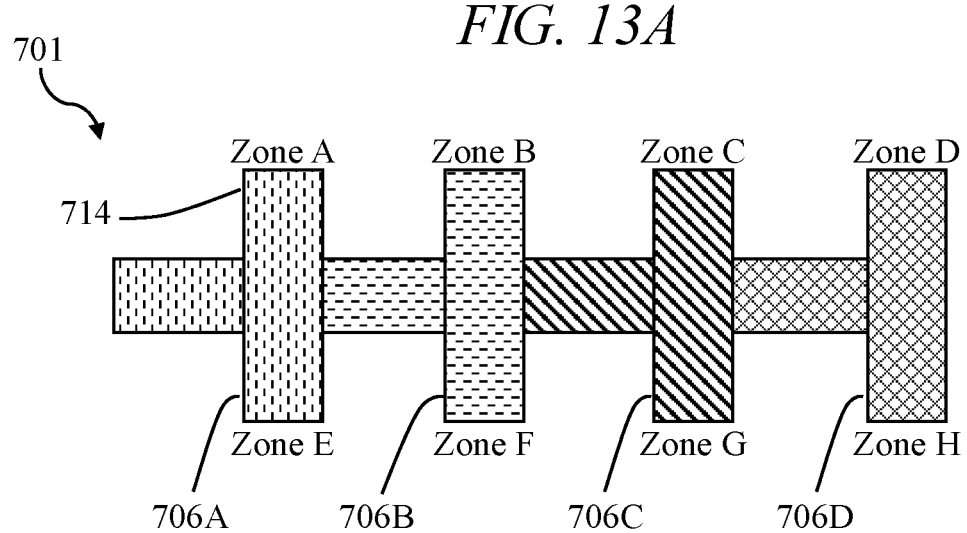
FIGS. 13A and 13B are schematic diagrams in accordance with some embodiments.
Figure 13B:
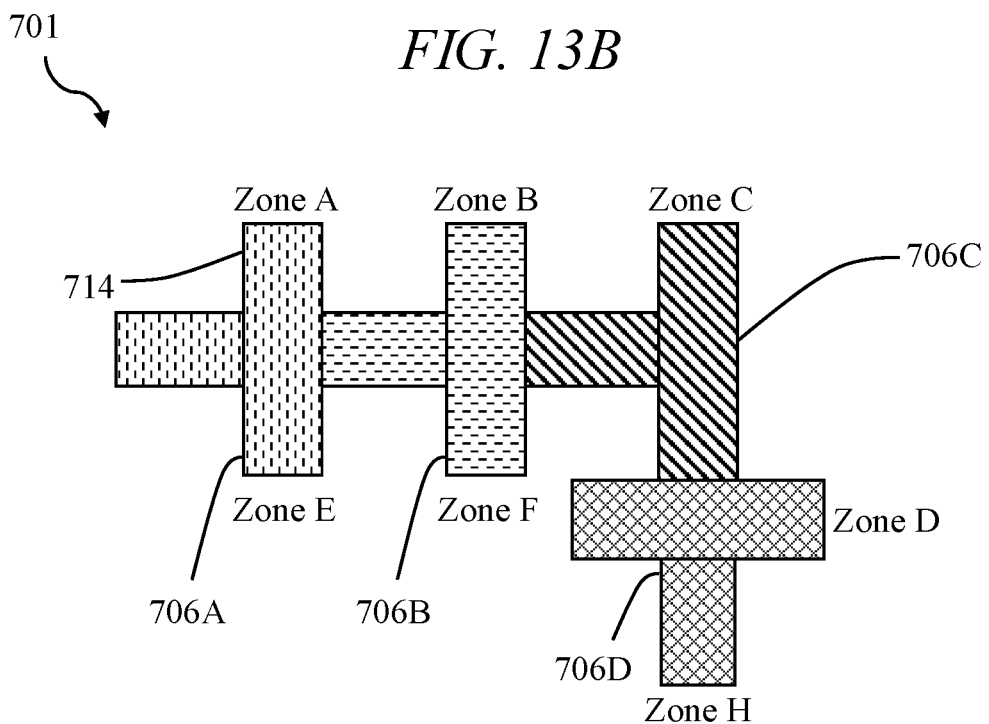

An example is shown in FIGS. 13A and 13B. FIG. 13A is a schematic diagram showing four sortation modules 706A, B, C, D extending sequentially from left to right in a linear arrangement. Of course, one or more sortation modules 706 may be added or removed to alter the length. Also, one or more of the coupling portions 612 may be folded down to accommodate irregular spaces. FIG. 13B is a schematic diagram in which the arrangement conveyor assembly 701 has been modified to a branched form. In this form, the fourth sortation module 706D has been shifted to a new downward position off of a coupling portion 612 of the third sortation module 706C.

Another advantage of the conveyor assembly 701 is that it tracks destination lanes (or zones) 714 even when one sortation module 706 is replaced or interchanged with another sortation module 706. More specifically, a control circuit 716 and/or the sortation modules 706 themselves are able to track the positions of the sortation module 706 and adjust the operation of the units accordingly to send merchandise to the correct destination lane (or zone) 714. In this context, the term "control circuit" has been described above.

Figure 14A:
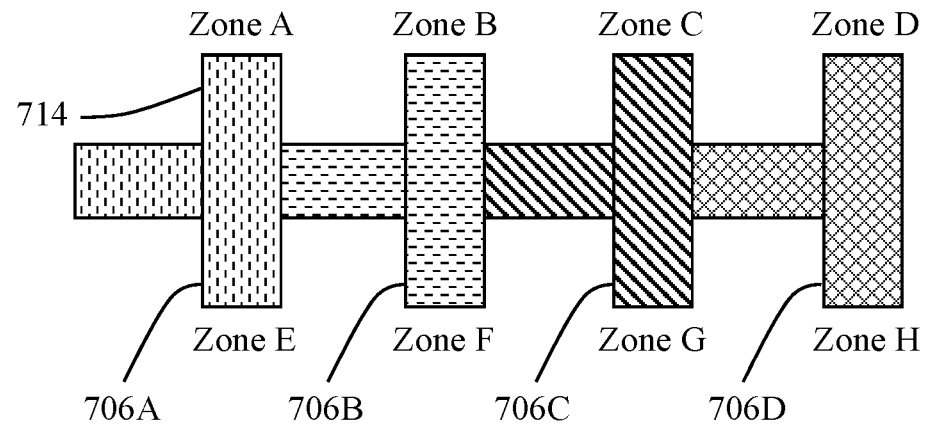
FIGS. 14A and 14B are schematic diagrams in accordance with some embodiments.
Figure 14B:
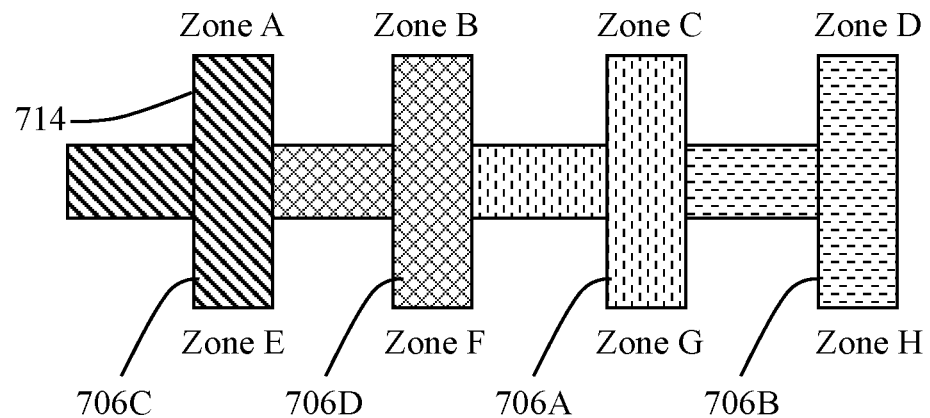

Another example is shown in FIGS. 14A and 14B. FIG. 14A is a schematic diagram again showing the four sortation modules 706A, B, C, D extending sequentially from left to right in a linear arrangement. In this form, there are a total of eight destination lanes (or zones) with Zones A and E corresponding to sortation module 706A, Zones B and F corresponding to sortation module 706B, Zones C and G corresponding to sortation module 706C, and Zones D and H corresponding to sortation module 706 D. In FIG. 14B, the sortation modules have been rearranged so that they are in the following sequential order from left to right: 706C, 706D, 706A, and 706B. It is generally contemplated that, in one form, the sortation modules 706 may be removed from a transport vehicle 200, 300 where they may be arranged haphazardly. When they are set up for unloading, it is contemplated that they will be arranged in the desired geometric pattern (for example, linearly) without regard to how they have been arranged in past unloading operations. As can be seen in FIGS. 14A and 14B, it is contemplated that the destination lanes (or zones) 714 will remained fixed or constant regardless of the new relative positions of the sortation modules 706.

It is also contemplated that the system 700 is arranged for automatic dynamic configuration based on a reduced number of modules. Essentially, if a sortation module 706 becomes impaired and is not replaced, the system 700 may distribute merchandise to the remaining destination lanes (or zones) based on certain criteria. For example, the control circuit 716 may be configured to select an alternative destination lane 714 based on destination "load" (the alternative destination lane 714 is expected to receive a low number of merchandise items). In one approach, this reconfiguration may be predetermined, i.e., a specific default profile may be created to address a specific reduction in the number of available destination lanes 714.

This automatic dynamic configuration approach may arise in several situations. First, the forward conveyor portion of the sortation module 706 may be operational, but the divert portion may not be working. So, the impaired sortation module 706 may still deliver merchandise to other sortation modules 706. Second, if the impaired module 706 is completely non-functional and no replacement module is available, it can be removed from the conveyor assembly 701, and the destination lanes 714 can be reconfigured. In both of these examples, the number of available destination lanes 714 is reduced, so the system 700 provides for automatic dynamic configuration to send affected merchandise to new destination lanes 714.

It is generally contemplated that the determination of the positions of the sortation modules 706 may be determined when the conveyor assembly 701 is powered up via an operator interface for an unloading and sorting operation. In one form, it is contemplated that the control circuit 716 includes a controller core 718 that communicates with each sortation module 706A, 706B, 706C, and 706D to track the position of each sortation module. Alternatively, or in addition, it is contemplated that each sortation module 706A, 706B, 706C, and 706D may also communicate with other sortation modules to track the position of each sortation module relative to one another. The sortation modules 706 may include sensors and/or separate controllers to facilitate the detection of their relative positions.

In one form, this disclosure describes the use of a controller core 718. This core 718 may be housed at or near the conveyor assembly 701 itself, such as at the merchandise identifier 704. However, it is also contemplated that control may be handled remotely. In one example, the system 700 may include an input/output hub (such as via communication system 412) that communicates wirelessly with a remote command and control center or a cloud computing system using remote server(s). In this example, processing would occur remotely, not at the conveyor assembly 701.

The determination of the presence and/or positions of the sortation modules 706 may be handled in various ways. One approach is to employ a master/slave architecture with two way communication. In one example, the control circuit 716 may include a controller core 718 that queries each sortation module 706, i.e., the core 718 transmits a signal to each sortation module 706 and, in response, each sortation module 706 transmits a return signal. In other words, the system 700 may utilize a query/response model with the main core 718 making a query to each sortation module 706 and expecting a response from it to ascertain the position of the modules 706 installed in the system 700. Characteristics of these signals, or simply their presence, may be used by the core 718 to determine the relative positions of the sortation modules 706, i.e., that sortation module 706B is downstream of sortation module 706A.

Alternatively, in another example, each sortation module 706 may be configured to automatically transmit a signal upon being powered up. In other words, each sortation module 706 may self-detect its installation and position and announce its presence and position to the controller core 718. This approach may rely on one-way communication to establish position. Optionally, this approach could have each sortation module 706 continue to transmit a signal at predetermined time intervals until receiving some sort of acknowledgment signal from the controller core 718. In other words, if the sortation module 706 does not receive an acknowledge message back from the core 718, the module 706 will wait a period of time (either random or fixed duration) and make another announcement attempt.

In another form, sensors or separate controllers of the sortation modules 706 may be "daisy chained" together so that the each sortation module 706 communicates with the other sortation modules 706, i.e., sortation module 706B "knows" that it is downstream of sortation module 706A. In other words, separate controllers may provide some sort of query/response signals or announcement signal amongst each other to determine relative positions. This approach may also involve communications and signals to the controller core 718. Under any approach, this determination of relative position also enables the use of spare sortation modules 706 that can replace damaged or defective sortation modules, thereby minimizing down time of the conveyor assembly 701.

This position determination may need to be customized for branched conveyor assemblies, such as shown in FIG.

13B. For example, in one form, Zone F may be fed by two lines, which may be permissible because of the volume or size of items sorted to that zone or other reasons. The destination lanes 714 should be matched to the appropriate sortation modules 706.

In this configuration in FIG. 13B, Zone F now has two branches of the conveyor assembly 701 leading to it. It is generally contemplated that each branch may have one or more sensors (such as photo eyes/photoelectric sensors) to determine when merchandise has been diverted and/or when a branch or destination is full. In one form, a visual or auditory alert can be provided to notify and employee that a branch or destination is full and needs to be cleared manually.

In another form, the control circuit 716 may be configured to select an alternative destination lane 714 when the branch or destination lane 714 is full. In other words, the system 700 can send merchandise to the second destination for Zone F if the first is detected to be full (and vice versa if the second destination is the default and is detected to be full). Also, FIG. 13B shows that Zone G is lost due to the branched configuration. In this form, the control circuit 716 may combine the merchandise that would have been sorted to Zone G into a different zone. This new zone sort decision may be based on such facts as the expected zone case count or volume (the merchandise is assigned to the new zone with the fewest expected merchandise). As another example, the new zone sort decision may be based on the closest physical destination to the original, i.e., the closest zone or an adjacent zone.

Figure 15:
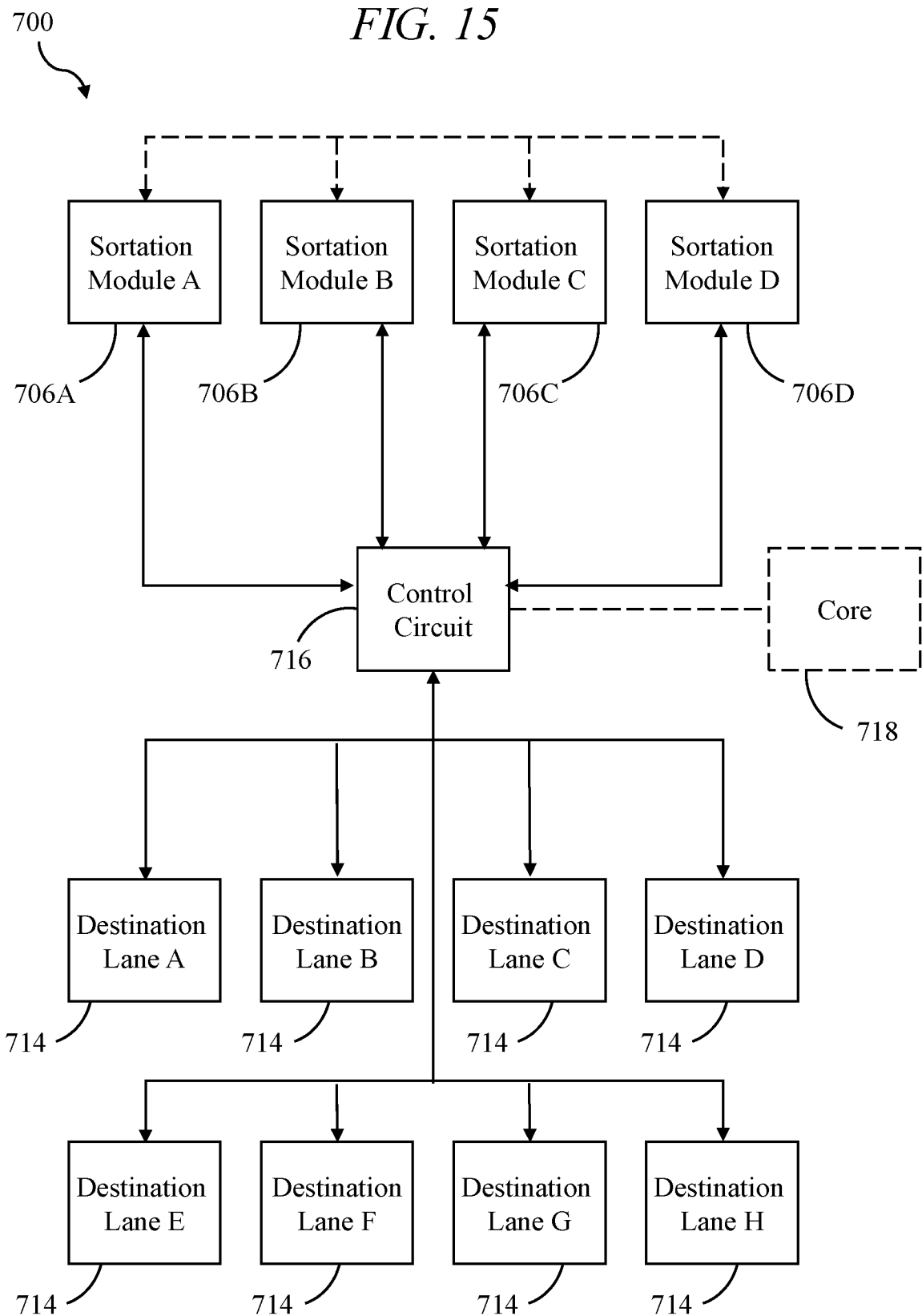
FIG. 15 is a block diagram in accordance with some embodiments.

FIG. 15 shows a block diagram showing various components of the exemplary system 700. In one form, the control circuit may be in communication with several (in this example, four) sortation modules 706A-D. The control circuit may include a controller core 718 that communicates with the sortation module 706A-D to track their relative positions. The control circuit 716 may receive input in the form of sortation criteria in which certain types of merchandise are to be sorted to the same destination. The control circuit 716 may assign destination lanes 714 to the sortation module 706A-D in the appropriate position.

Figure 16:
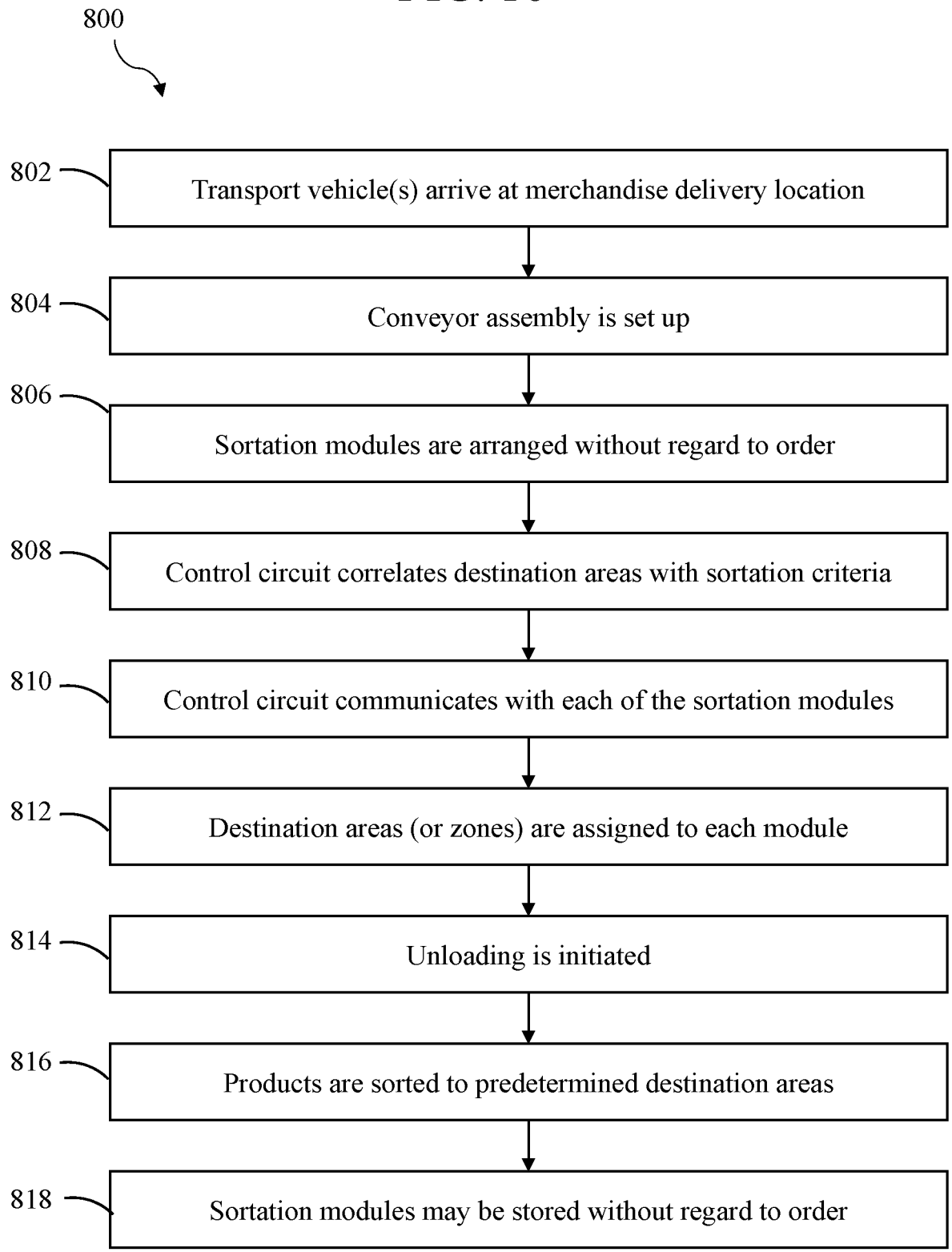
FIG. 16 is a flow diagram in accordance with some embodiments.

FIG. 16 shows an exemplary process 800 for unloading and sorting that may use interchangeable sortation modules 706. At block 802, a transport vehicle arrives at the merchandise distribution location. It is contemplated that the transport vehicle may carry the sortation modules and merchandise (and/or that additional delivery vehicles will transport merchandise to the merchandise distribution location). At block 804, the conveyor assembly is set up or has been set up already prior to delivery. At block 806, the sortation modules are arranged in no particular order relative to one another. Assuming that the terrain where they have been offloaded is suitable, they may be moved and rearranged in any desired number and geometric pattern.

At blocks 808-12, the control circuit correlates the destination lanes (or zones) with the desired sortation criteria, communicates with the sortation modules, and assigns destination lanes to a sortation module that is in the appropriate position. At blocks 814 and 816, the unloading operation commences, and merchandise is sorted to destination lanes in accordance with the sortation criteria. After the sorting operation is completed, at block 818, the sortation modules may be stored without a need to track the order of the sortation modules for future unloading and sorting operations.

In another form, there is disclosed a system 900 that uses merchandise identifier 904 to identify the merchandise and to access sortation criteria relating to the merchandise. In some conventional approaches, reading merchandise label may not provide information specific to that merchandise that might be accessible at the location where the conveyor assembly is operating. Here, in contrast, it is contemplated that the control circuit 916 in cooperation with the merchandise identifier 904 is able to identify the merchandise and cross-reference information, possibly from multiple sites and sources.

Figure 17:
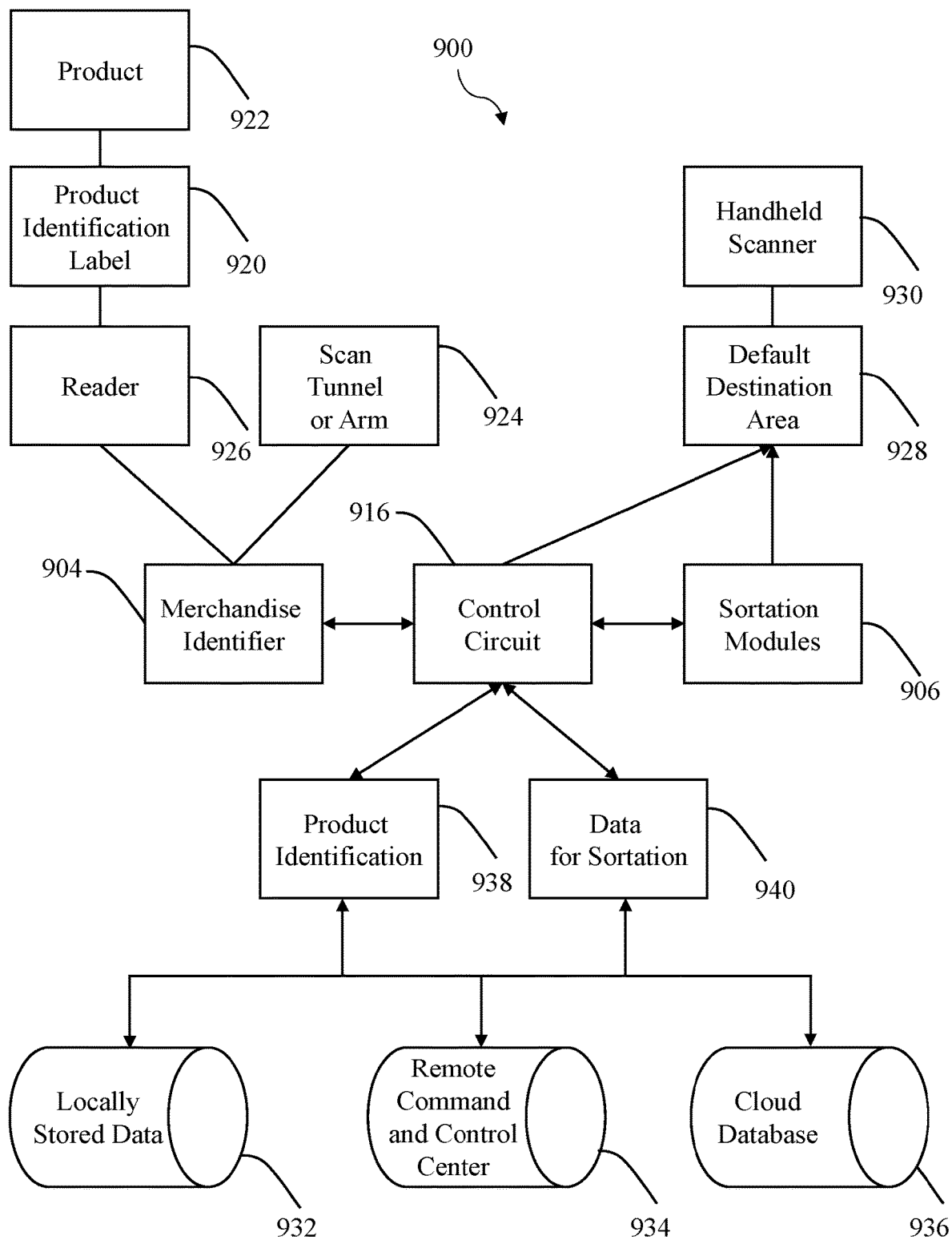
FIG. 17 is a block diagram in accordance with some embodiments.

Referring to FIG. 17, the merchandise identifier 904 may generally be in any shape suitable for reading identification labels 920 on merchandise 922. In one form, the merchandise identifier 904 may be a scan tunnel or arm 924 extending above a plurality of rollers that support and propel the merchandise 906 therethrough. The merchandise identifier 904 includes a reader 926 for reading the identification labels 920, and the reader 926 may be any of various known reader types, such as a bar code reader, an RFID reader, an NFC reader, a laser imager, an optical sensor, an image processor, or a text capture device. The merchandise identifier 904 may be in any general form as long as its reader 926 is properly oriented for reading identification labels 920 on merchandise 922 passing nearby or through it. In another form, the merchandise identifier 904 may include multiple readers for multi-position scanning to avoid failure to scan based on faulty label orientation. For example, the readers may be overhead, underneath, along the sides, between rollers, and/or front or rear facing readers with respect to the merchandise.

The data from the identification label 920 is transmitted to control circuit 916. If the merchandise identifier 904 is unable to read the label 920 (such as because of improper orientation or a damaged label), the control circuit 916 communicates with the sortation modules 906 to divert the merchandise 922 to a predetermined (or default) destination lane 928 for unscannable merchandise. A user with a handheld scanner 930 may then attempt to manually scan the label 920, and the reading from this scanner 930 may be transmitted to the control circuit 916. At that point, the merchandise 922 may be placed on the sortation modules 906 for sortation, the user may manually deposit the merchandise 922 in a destination lane, or the merchandise 922 may be left for further handling after sortation is completed. Alternatively, instead of attempted rescanning, the merchandise may be taken manually to an appropriate destination lane.

Once the merchandise 922 is identified, it is contemplated that the control circuit 916 will use the merchandise identification 938 to access other data (sortation data 940) relating to the merchandise as sortation criteria to selectively determine the destination lane for the merchandise 922. It is contemplated that sortation criteria have been selected based on the nature of the emergency and an appropriate response, and the control circuit 916 will access merchandise data 940 to determine the destination lane in view of the selected sortation criteria. In one form, it is contemplated that the control circuit 916 accesses the merchandise data in any of various ways, such as via push, pull, or direct access to a database.

In one form, the merchandise data may be stored in a local database 932 associated with the control circuit 916. For example, the merchandise data may be stored at a local database 932 at or near the conveyor assembly. This approach may be desirable where a relatively small number of known types of merchandise items and kits will be distributed at the merchandise distribution location (or location of the emergency response). If there is sufficient time for advance planning, the types of merchandise may be determined ahead of time, and the corresponding merchandise data may be stored at a local database 932. In another form, the merchandise data may be retrieved from a remote command control center 934. This approach may be desirable where the types of merchandise being distributed is continually being updated, and additional delivery vehicles may be arriving at the location of the emergency response with new types of merchandise. In another form, the merchandise data may be retrieved from a cloud database 936. Of course, the merchandise identification 938 and other data may also be collected by some combination of local and remote databases.

Figure 18:
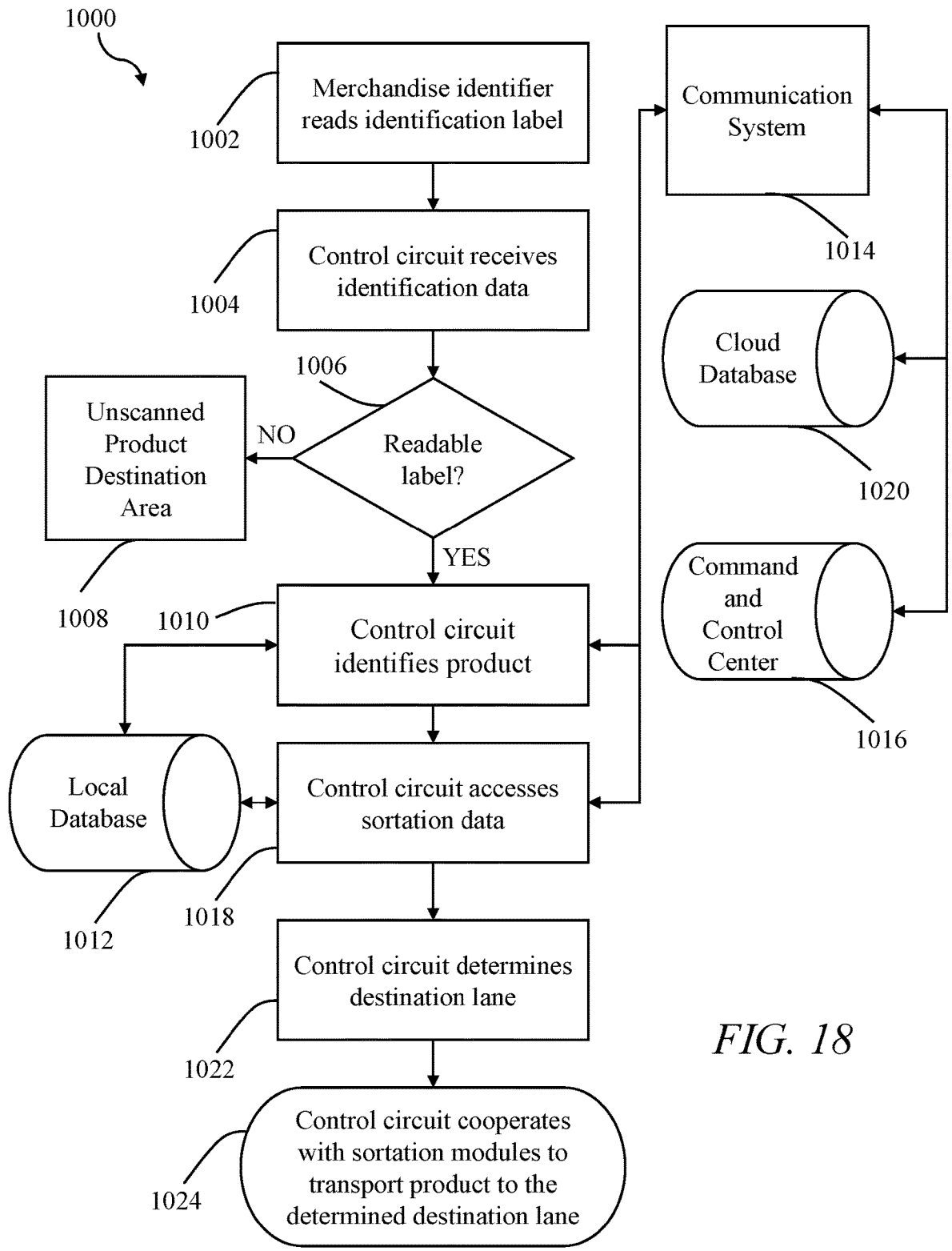
FIG. 18 is a flow diagram in accordance with some embodiments.

Referring to FIG. 18, in one form, there is disclosed a process 1000 that may use merchandise identifier 904. A merchandise identifier reads a merchandise identification label, and a control circuit uses this data to both identify the merchandise and to access sortation criteria relating to the merchandise. It is generally contemplated that the control circuit preferably accesses real time data during the sortation procedure to determine the appropriate destination lane based on sortation criteria selected that are appropriate to the nature of the emergency.

At block 1002, the merchandise identifier reads the identification label. As described above, the merchandise identifier may be any of various structures. Further, the merchandise identifier may include any of various types of known readers, and the label may be any of various machine readable codes. At block 1004, the control circuit receives the identification data read by the merchandise identifier.

At block 1006, the control circuit determines if the identification is readable. If it is not readable, the control circuit communicates with the sortation modules to direct the merchandise to an unscannable merchandise destination lane, as shown at block 1008. In other words, when the reader cannot read the label, the merchandise is identified as unknown, and the system can direct the unidentified merchandise to a predefined "manual intervention" staging zone. The merchandise may be handled manually at that destination lane.

At block 1010, the control circuit identifies the merchandise. It may make this identification based on accessing any of various databases. For example, in one form, it may access a local database 1012 with merchandise data relating to the types of merchandise selected for distribution. In one form, the local database 1012 may be updated periodically with data mapping the label to the merchandise and may be downloaded to a memory device or database that the control circuit can access at or near the conveyor assembly. In another form, the control circuit may wirelessly communicate via communication system 1014 with a remote command and control center 1016 or cloud database 1020.

At block 1018, following identification of the merchandise, the control circuit accesses sortation data related to the merchandise. Processing speed is a consideration, so accessing only the necessary data may be desirable as that will increase processing and sorting speed, as well as reduce data transmission cost and errors. It is contemplated that the user has previously selected sortation criteria for the sortation of merchandise that are appropriate to the nature of the emergency and the required response. In one form, these sortation criteria may be determined on a case-by-case basis for each emergency. In another form, there may be "default profiles" that have been created to address known categories of emergencies (i.e., hurricanes, earthquakes, weather events, power blackouts, etc.). Alternatively, the user may customize a profile to adapt the sortation criteria to circumstances that may be unique to a certain emergency.

At block 1022, the control circuit determines the sortation destination lane for the merchandise. As addressed above, the sortation destination lanes may correspond to specific merchandise items or to kits (combinations) of merchandise. At block 1024, the control circuit communicates with the sortation modules to transport the merchandise to the appropriate destination lane.

Figure 19:
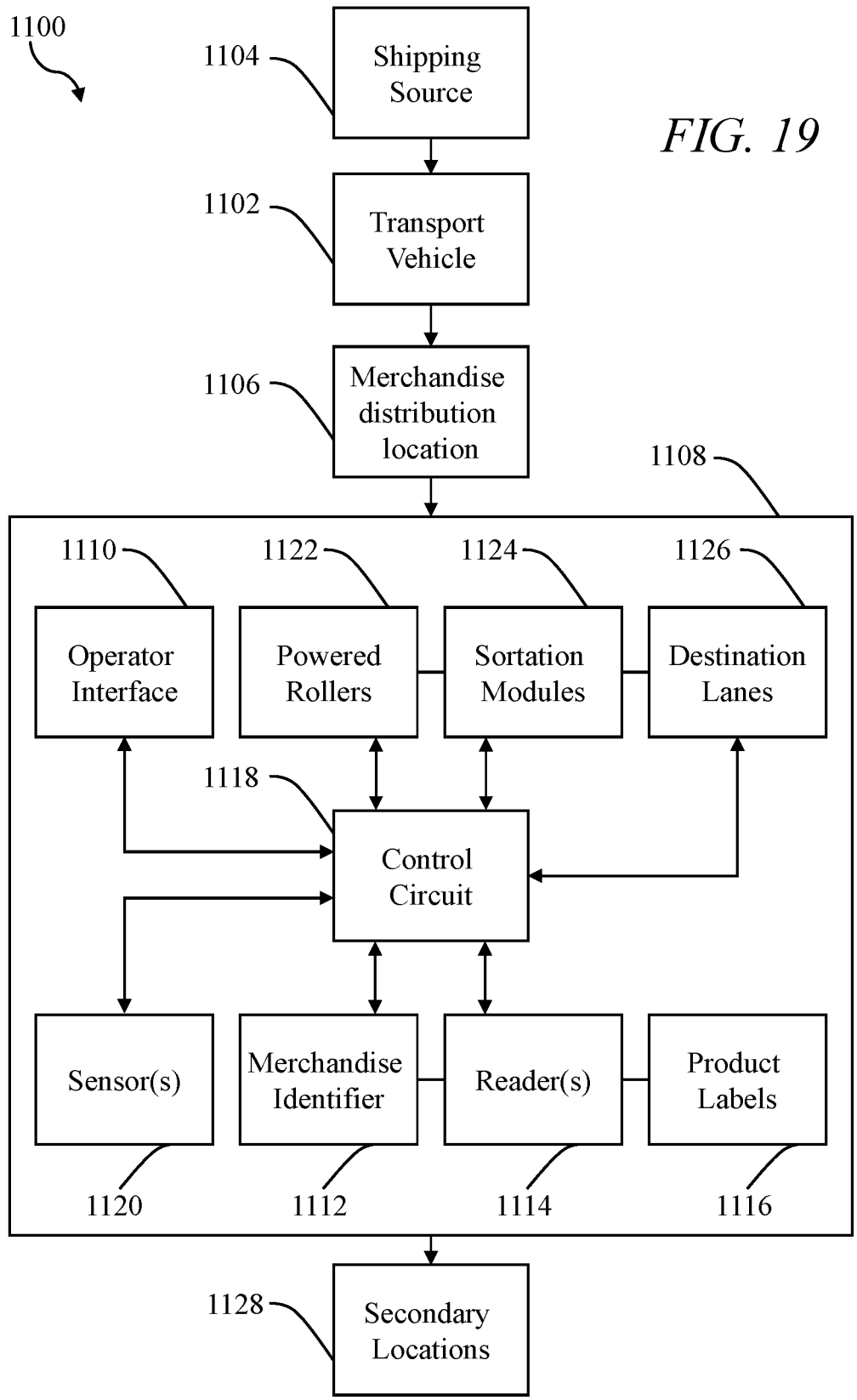
FIG. 19 is a block diagram in accordance with some embodiments.

Referring to FIG. 19, in one form, there is shown a block diagram of an overall receiving system 1100. As can be seen, a transport vehicle 1102 transports merchandise from a shipping source 1104 (such as a warehouse) to a merchandise distribution location 1106 at or near the site of the emergency. The merchandise is unloaded and sorted using a conveyor assembly 1108, which may be activated via an operator interface 1110. Merchandise identifier 1112 includes one or more readers 1114 that reads the identification data from merchandise labels 1116, which are transmitted to control circuit 1118. The conveyor assembly 1108 may include sensors 1120 that detect and/or track merchandise position to allow the control circuit 1118 to operate powered rollers 1122 in the sortation modules 1124 to maintain the minimum distance between merchandise. The control circuit 1118 may identify the merchandise by accessing a local database (or a remote database) and may sort the merchandise to destination lanes 1126 via sortation modules 1124. Following the sorting operation, merchandise may optionally be transported from destination lanes 1126 to appropriate secondary distribution locations 1128, such as, for example, by pallets and carts.

Figure 20:
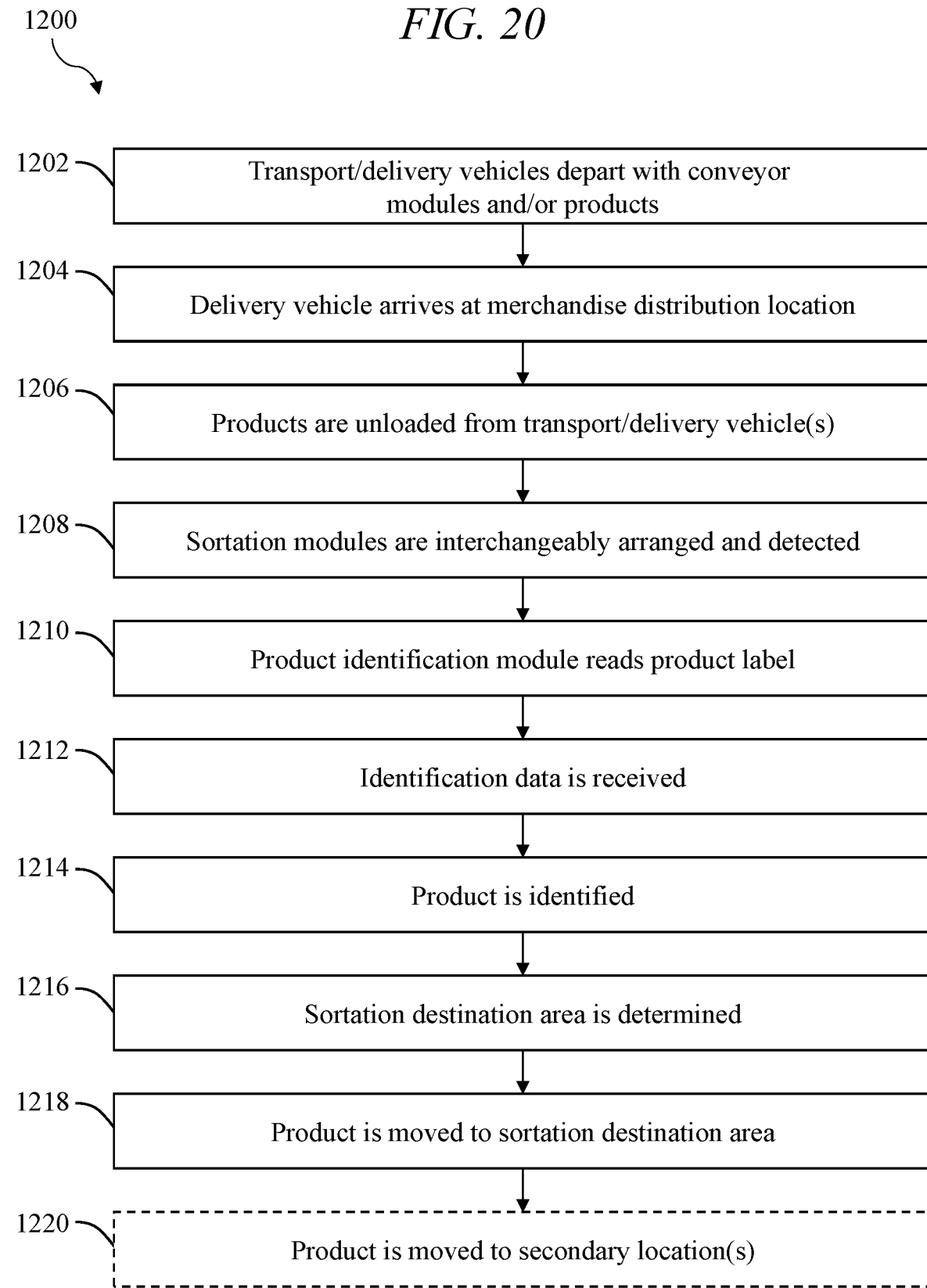
FIG. 20 is a flow diagram in accordance with some embodiments.

Referring to FIG. 20, in one form, there is shown a flow diagram of an overall receiving process 1200. At block 1202, one or more transport and delivery vehicles depart with conveyor modules and a shipment of merchandise. At blocks 1204 and 1206, they arrive at the merchandise distribution location at or near the emergency response location, and the merchandise is unloaded. At block 1208, the conveyor assembly is set up, and sortation modules may be arranged interchangeably, regardless of order. At blocks 1210 1212, and 1214, the merchandise identifier reads merchandise labels, and the control circuit receives and identifies the merchandise. At blocks 1216, 1218, and 1220, sortation destination lanes are determined by applying sortation criteria to merchandise data, merchandise are moved to appropriate sortation destination lanes via the sortation modules, and merchandise are then optionally transported to secondary locations for distribution.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A portable distribution center for distributing merchandise items in response to emergencies, the portable distribution center comprising:
   a transport vehicle comprising:
      a locomotion system configured to facilitate movement of the transport vehicle to merchandise distribution location;
      a floor and a plurality of sidewalls, the plurality of sidewalls configured to be upright during movement of the transport vehicle and configured to be folded down at the merchandise distribution location;

the floor and plurality of foldable sidewalls configured to serve as a work platform during operation of the portable distribution center at the merchandise distribution location;

a conveyor system integrated into the transport vehicle and configured for sortation and distribution of merchandise items upon arrival at the merchandise distribution location, the conveyor system comprising:

merchandise identifier disposed at one end of the conveyor system and configured to read identification data from an identification label disposed on merchandise item;

a plurality of sortation units configured to receive and move merchandise items to one of a predetermined plurality of uniquely identified sortation destination lanes;

a control circuit operatively coupled to the merchandise identifier and to each of the sortation units, the control circuit configured to:

assign the merchandise items to the uniquely identified sortation destination lanes based on emergency conditions at the merchandise distribution location;

receive the identification data from the merchandise identifier to determine the uniquely identified destination lane for each merchandise item;

communicate with the plurality of sortation units to move and divert the merchandise items to the uniquely identified sortation destination lanes;

a power supply configured to energize the conveyor system at the merchandise distribution location;

a communication system configured to transmit and receive instructions regarding operation of the conveyor system;

wherein the control circuit separates the merchandise items into predetermined kits, each predetermined kit including one or more different types of merchandise items defining the kit being diverted to a uniquely identified sortation destination lane.

2. The portable distribution center of claim 1, wherein the conveyor system is mounted to the floor of the transport vehicle.

3. The portable distribution center of claim 1, wherein the transport vehicle further comprises a plurality of fasteners configured to facilitate movement of the plurality of sidewalls between an upright state and a folded down state.

4. The portable distribution center of claim 1, wherein the merchandise identifier comprises one or more of a laser scanner, an RFID scanner, and a barcode reader.

5. The portable distribution center of claim 1, wherein the conveyor system further comprises merchandise database associating merchandise item to a uniquely identified sortation destination lane.

6. The portable distribution center of claim 1, wherein the control circuit is configured to communicate with a remote command and control center to determine the correspondence of merchandise items to uniquely identified sortation destination lanes.

7. The portable distribution center of claim 1, wherein the power supply comprises one or more of a battery, a generator, propane, a hydrogen fuel cell, and a solar cell.

8. The portable distribution center of claim 1, wherein the communication system comprises one or more of satellite uplink, fiber, cell, NFC/Bluetooth, radio, and light beacon communication elements.

9. The portable distribution center of claim 1 further comprising a retractable canopy configured for installation above the conveyor system following arrival at the merchandise distribution location, the retractable canopy facilitating the shielding of the conveyor system from environmental conditions.

10. The portable distribution center of claim 1, wherein the transport vehicle is an autonomous ground vehicle (AGV), the AGV further comprising:

at least one obstacle detection sensor configured to detect obstacles in a direction of travel of the AGV;

a navigational system configured to guide movement of the AGV and avoid obstacles; and an AGV control circuit operatively coupled to the locomotion system, the at least one obstacle detection sensor, and the navigational system, the AGV control circuit configured to operate and move the AGV.

11. The portable distribution center of claim 1 further comprising at least one optical sensor configured to detect theft of merchandise items and to facilitate security.

12. A portable distribution center for distributing merchandise items in response to emergencies, the portable distribution center comprising:

a transport vehicle comprising a locomotion system configured to facilitate movement of the transport vehicle to merchandise distribution location;

a conveyor assembly configured for sortation and distribution of merchandise items upon arrival at the merchandise distribution location, the conveyor assembly comprising:

merchandise identifier disposed at one end of the conveyor assembly and configured to read identification data from an identification label disposed on merchandise item;

a plurality of interchangeable sortation units configured for movement to different positions with respect to one another and for assembly to form different arrangements of the conveyor assembly;

the plurality of interchangeable sortation units configured to receive and move merchandise items to one of a predetermined plurality of uniquely identified sortation destination lanes following assembly of the conveyor assembly;

a control circuit operatively coupled to the merchandise identifier and to each of the interchangeable sortation units, the control circuit configured to:

communicate with each interchangeable sortation unit to determine its position and the positions of the uniquely identified sortation destination lanes following assembly;

assign the merchandise items to the uniquely identified sortation destination lanes based on emergency conditions at the merchandise distribution location;

receive the identification data from the merchandise identifier to determine the uniquely identified destination lane for each merchandise item;

communicate with the plurality of sortation units to move and divert the merchandise items to the uniquely identified sortation destination lanes;

a power supply configured to energize the conveyor assembly at the merchandise distribution location;

a communication system configured to transmit and receive instructions regarding operation of the conveyor assembly;

wherein the control circuit separates the merchandise items into predetermined kits, each predetermined kit including one or more different types of merchandise items defining the kit being diverted to a uniquely identified sortation destination lane.

13. The portable distribution center of claim 12, wherein the transport vehicle further comprises a guide rod or guide track to facilitate transport of the plurality of sortation units from inside the transport vehicle to outside the transport vehicle following arrival of the transport vehicle at the merchandise distribution location.

14. The portable distribution center of claim 12 further comprising a plurality of hydraulic actuators to facilitate leveling of the conveyor assembly on an uneven surface or adjusting it to a desired height at the merchandise distribution location.

15. The portable distribution center of claim 12, wherein the merchandise identifier comprises one or more of a laser scanner, an RFID scanner, and a barcode reader.

16. The portable distribution center of claim 12, wherein the conveyor system further comprises merchandise database associating merchandise item to a uniquely identified sortation destination lane.

17. The portable distribution center of claim 12, wherein the control circuit is configured to communicate with a remote command and control center to determine the correspondence of merchandise items to uniquely identified sortation destination lanes.

18. The portable distribution center of claim 12, wherein the power supply comprises one or more of a battery, a generator, propane, a hydrogen fuel cell, and a solar cell.

19. The portable distribution center of claim 12, wherein the communication system comprises one or more of satellite uplink, fiber, cell, NFC/Bluetooth, radio, and light beacon communication elements.

20. The portable distribution center of claim 12 further comprising a retractable canopy configured for installation above the conveyor assembly following arrival at the merchandise distribution location, the retractable canopy facilitating the shielding of the conveyor assembly from environmental conditions.

21. The portable distribution center of claim 12, wherein the transport vehicle is an autonomous ground vehicle (AGV), the AGV further comprising:
at least one obstacle detection sensor configured to detect obstacles in a direction of travel of the AGV;
a navigational system configured to guide movement of the AGV and avoid obstacles; and
an AGV control circuit operatively coupled to the locomotion system, the at least one obstacle detection sensor, and the navigational system, the AGV control circuit configured to operate and move the AGV.

22. The portable distribution center of claim 12 further comprising at least one optical sensor configured to detect theft of merchandise items and to facilitate security.

23. A method of distributing merchandise items in response to emergencies, the method comprising:
providing a transport vehicle comprising a locomotion system configured to facilitate movement of the transport vehicle to merchandise distribution location;
loading merchandise identifier of a conveyor assembly onto the transport vehicle, the merchandise identifier configured to read identification data from an identification label disposed on merchandise item;
loading a plurality of sortation units of the conveyor assembly onto the transport vehicle, the plurality of sortation units configured to receive and move merchandise items to one of a predetermined plurality of uniquely identified sortation destination lanes;
by the transport vehicle, transporting the merchandise identifier and the plurality of sortation units of the conveyor assembly to the merchandise distribution location;
energizing the conveyor assembly at the merchandise distribution location; and
by a control circuit:
assigning the merchandise items to the uniquely identified sortation destination lanes based on emergency conditions at the merchandise distribution location;
receiving the identification data from the merchandise identifier to determine the uniquely identified destination lane for each merchandise item;
communicating with the plurality of sortation units to move and divert the merchandise items to the uniquely identified sortation destination lanes; and
separating the merchandise items into predetermined kits, each predetermined kit including one or more different types of merchandise items defining the kit being diverted to a uniquely identified sortation destination lane.

24. The method of claim 23, wherein:
the transport vehicle further comprises:
a floor and a plurality of sidewalls, the plurality of sidewalls configured to be upright during movement of the transport vehicle and configured to be folded down at the merchandise distribution location;
the floor and plurality of foldable sidewalls configured to serve as a work platform during operation of the portable distribution center at the merchandise distribution location; and
the conveyor system is integrated into the transport vehicle.

25. The method of claim 23 further comprising:
removing the merchandise identifier and the plurality of sortation units from the transport vehicle following arrival at the merchandise distribution location;
arranging and assembling the merchandise identifier and plurality of sortation units; and
communicating with each sortation unit to determine its position and the positions of the uniquely identified sortation destination lanes following assembly.

* * * * *